US012489227B2

(12) United States Patent
Tamrakar et al.

(10) Patent No.: US 12,489,227 B2
(45) Date of Patent: Dec. 2, 2025

(54) COMBINED ANTENNA STRUCTURE

(71) Applicant: Intel Corporation, Santa Clara, CA (US)

(72) Inventors: Maruti Tamrakar, Chhattisgarh (IN); Prathibha Peddireddy, Bangalore (IN); Jayprakash Thakur, Bangalore (IN); Anoop Parchuru, Bangalore (IN); Prasanna Pichumani, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 18/347,587

(22) Filed: Jul. 6, 2023

(65) Prior Publication Data

US 2024/0055779 A1 Feb. 15, 2024

(30) Foreign Application Priority Data

Aug. 9, 2022 (IN) ............................ 202241045519

(51) Int. Cl.
*H01Q 21/28* (2006.01)

(52) U.S. Cl.
CPC .................................. *H01Q 21/28* (2013.01)

(58) Field of Classification Search
CPC ...... H01Q 1/2266; H01Q 1/241; H01Q 1/521; H01Q 5/40; H01Q 9/42; H01Q 13/10; H01Q 21/28
See application file for complete search history.

(56) References Cited

U.S. PATENT DOCUMENTS

| | | | | |
|---|---|---|---|---|
| 9,531,087 | B2 | 12/2016 | Ying | |
| 2014/0078009 | A1 | 3/2014 | Wong et al. | |
| 2017/0244154 | A1 | 8/2017 | Chou et al. | |
| 2020/0106160 | A1 | 4/2020 | Chen et al. | |
| 2020/0161764 | A1* | 5/2020 | Liao | H01Q 1/521 |
| 2020/0371562 | A1* | 11/2020 | Miyamoto | G06F 1/1616 |
| 2021/0175608 | A1* | 6/2021 | Ramasamy | H01Q 1/2266 |
| 2021/0336355 | A1* | 10/2021 | Kruger | H01Q 1/241 |
| 2022/0029298 | A1 | 1/2022 | Huang et al. | |
| 2024/0055778 | A1* | 2/2024 | Wang | H01Q 7/00 |
| 2024/0275059 | A1* | 8/2024 | Yong | H01Q 21/24 |

FOREIGN PATENT DOCUMENTS

| | | | |
|---|---|---|---|
| CN | 113839199 | A | 12/2021 |
| EP | 4030556 | A1 | 7/2022 |

OTHER PUBLICATIONS

Search Report issued for the corresponding European patent application No. 23 18 3061, dated Jan. 3, 2024, 14 pages (for informational purposes only).

* cited by examiner

*Primary Examiner* — Raymond R Chai
(74) *Attorney, Agent, or Firm* — Viering, Jentschura & Partner mbB

(57) ABSTRACT

A circuitry including a first antenna configured to communicate via a first RAT; including a substrate; and a second antenna located on the substrate of the first antenna configured to communicate via a second RAT, wherein communication via the first RAT does not interfere with communication via the second RAT.

20 Claims, 21 Drawing Sheets

COMBINED ANTENNA STRUCTURE

CROSS-REFERENCE TO RELATED APPLICATION(S)

This application claims priority to India Patent Application No. 202241045519 filed on Aug. 9, 2022, the contents of which are fully incorporated herein by reference.

TECHNICAL FIELD

This disclosure may generally relate to the field of wireless communications.

BACKGROUND

Wireless communication devices may include various antennas for different wireless communication technologies. A wireless communication device, such as a laptop, may include two wireless fidelity (Wi-Fi) antennas and four cellular technology antennas. Additionally, a wireless communication device, such as a laptop, may include three more antennas for millimeter waves (mmWave) integration. Inclusion of other antennas may require additional space in the wireless communication device system because the placement of antennas may need some clearance from other sub-systems. The placement of a total of nine antennas in a laptop system may require a placement which minimizes radio frequency interference (RFI) to other sub-systems of the laptop. Isolation circuits may reduce RFI between two antennas in close proximity, but isolation circuits still occupy additional space for placing other antennas. Miniaturizing antennas and placing them in close proximity reduces the keep out zone (KOZ). However, the KOZ and the miniaturized antennas still require space. Wireless communication devices including 5G and Wifi antennas, often place the two types of antennas separately, but in close proximity to each other. This may require a spacing of 110 mm×7 mm which also includes the space between the two antennas to achieve required isolation. It would be beneficial to reduce the space required by multiple antennas while maintaining an acceptable level of RFI Placing one antenna inside another antenna, or co-locating antennas, may reduce the space requirement without compromising isolation and antenna performance. Co-locating the Wi-Fi and long term evolution (LTE) antennas may reduce the space requirement in wireless communication device. In turn, this may leave more space for a wireless communication device to include new antennas like mmWave antennas. Additionally, more space may be available for other sub-systems of the device. As discussed in this disclosure, the two antennas of different radio access technologies (RATs) may be co-located in a smaller space. For example, a Wi-Fi antenna and a fifth generation (5G) may be co-located in a space of 80×7 mm. co-locating or fusing two antennas would enable wireless communication devices to become thinner and lighter. Additionally, combined antennas may leave space for the placement of other sub-systems of a duce, such as USB, Woofer, connectors etc.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, the disclosure may be described with reference to the following drawings, in which.

DETAILED DESCRIPTION

Figure 1:
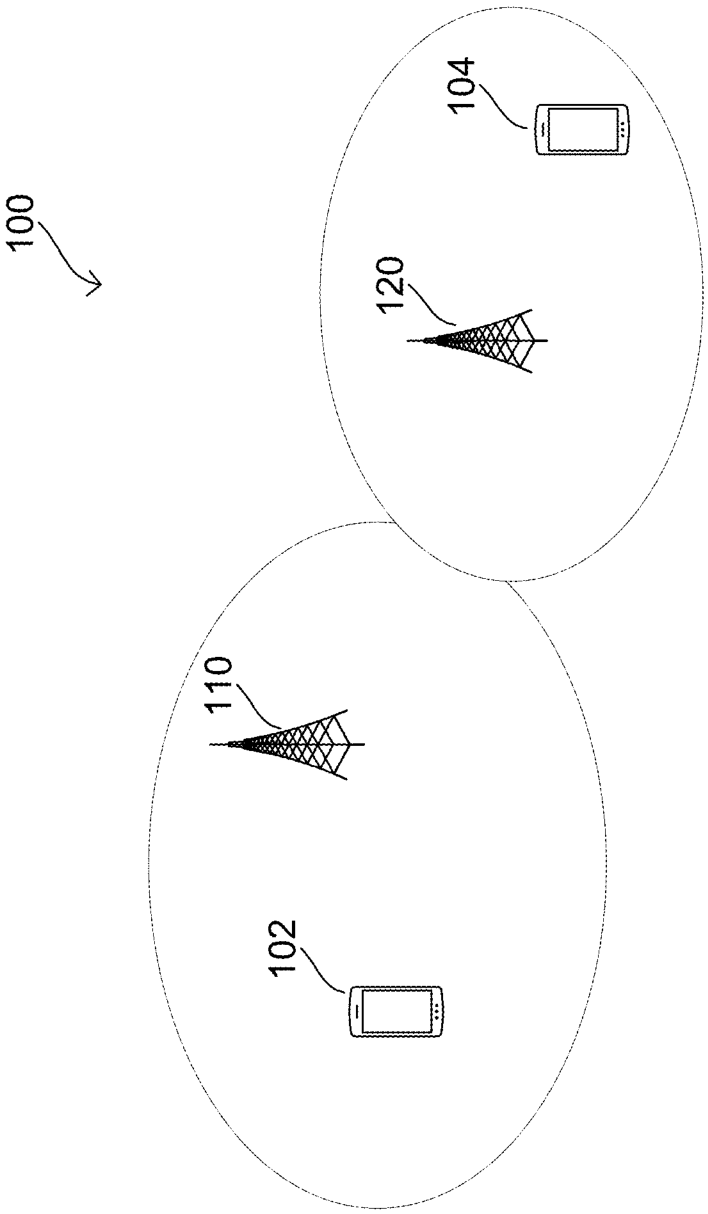
FIG. 1 illustrates an exemplary radio communication network.

In the following detailed description, numerous specific details are set forth in order to provide a thorough understanding of some examples. However, it will be understood by persons of ordinary skill in the art that some examples may be practiced without these specific details. In other instances, well-known methods, procedures, components, units and/or circuits have not been described in detail so as not to obscure the discussion.

Wireless communication devices may include multiple antennas communicating on different wireless communication technologies or RATs. To include more antennas in one wireless communication device, manufacturers may miniaturize the different antennas. Alternatively, manufacturers may place antennas configured for different wireless communication technologies in close proximity with isolation circuits in between the different antennas. However, these solutions still require space between antennas. This disclosure discusses placing an antenna of one RAT in another antenna of a second RAT or co-locating two antennas. Alternatively, the two antennas may be fused together. To combine two antennas one antenna may be designed for a magnetic field dominant technology while the second antenna may be designed for an electrical field dominant technology. For example, an antenna configured for 5G communication may be combined with an antenna configured for Wi-Fi 6 communication. Since the 5G and Wi-Fi 6 antennas are configured for different field communications, it is possible to achieve isolation over a wide frequency band. The two different antennas may be placed together such that the performance of one antenna does not disturb performance of the other antenna. This may achieve the wireless performance required for a wireless communication device.

Two antennas of different wireless communication technologies and types can be co-located in the same location without needing additional space between the two antennas. The proposed design co-locates two antennas configured for different RATs. The two antennas may be fused together or designed to be on a single substrate. The combined or co-located antenna design may position the two antennas in a way that will not degrade each other's performance even when they are placed in the same location and optimized to achieve −15 dB Isolation. This co-location also helps to restrict radio frequency interference (RFI) noise at one location. The combined antennas may achieve an isolation of less than 15 dB between the two different antennas over their entire operating band.

Combining two antennas may save space in a wireless communication device as two antennas are fused or co-located in one location. RFI interference with other sub-systems for both the antennas may be considered at position which saves the cost of having shields and RFI mitigation techniques at two different locations for each antenna. Both antennas may require a single radio frequency (RF) window for antenna radiation which helps for better industrial design of a laptop's exterior look. For example, the single radio frequency (RF) window may be a plastic radio frequency (RF) window. A wireless communication device chassis may include one opening or window for the co-located antennas. The co-located antennas may use the same specific absorption rate pad. For example, co-locating antennas may apply to co-locating a WLAN antenna with a 5G antenna or co-locating a WLAN antenna with a MIMO antenna. It should be noted that one may combine other antennas of different RATs.

FIG. 1 shows exemplary radio communication network 100, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/Wi-Fi, Bluetooth, 5G NR, mmWave, WiGig, etc.), these examples are illustrative and may be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), gNodeBs, or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or Wi-Fi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, Wi-Fi, mmWave, 5G NR, and the like, any of which may be applicable to radio communication network 100.

Figure 2:
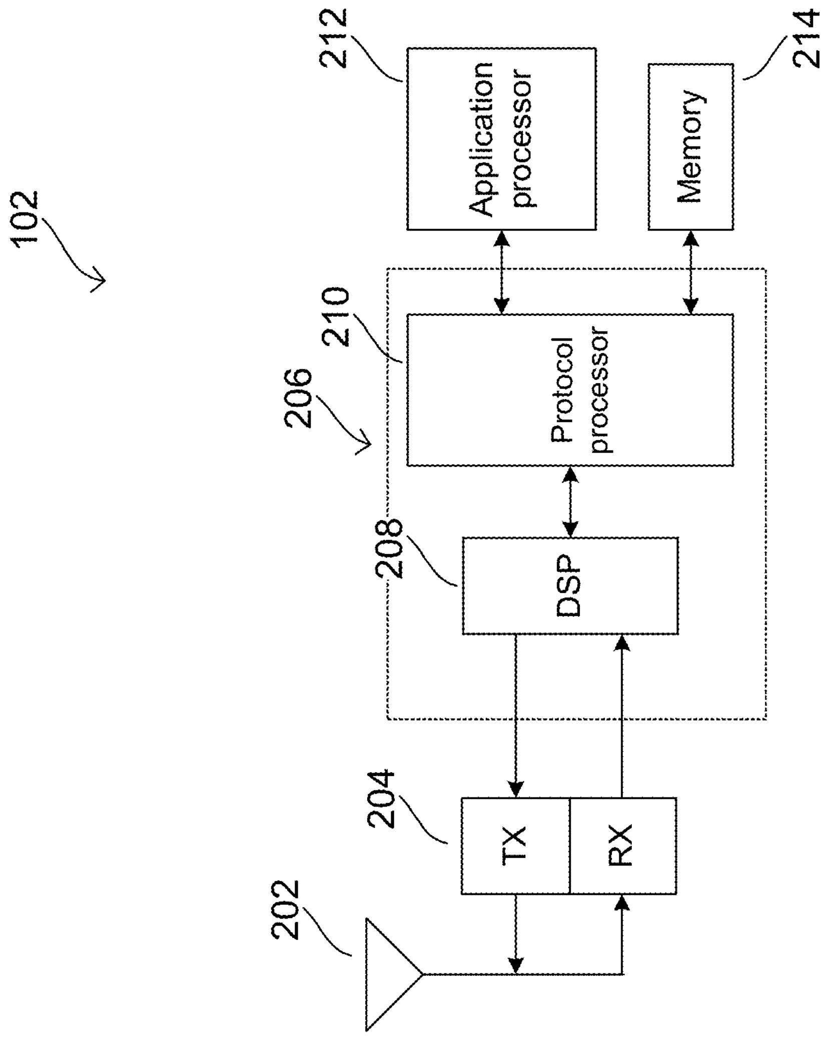
FIG. 2 illustrates an exemplary internal configuration of a terminal device.

FIG. 2 shows an exemplary internal configuration of terminal device 102, which may include antenna system 202, radio frequency (RF) transceiver 204, baseband modem 206 (including digital signal processor 208 and protocol controller 210), application processor 212, and memory 214. Although not explicitly shown in FIG. 2, terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202. Antenna system 202 may be a single antenna or may include one or more antenna arrays that each include multiple antenna elements. For example, antenna system 202 may include an antenna array at the top of terminal device 102 and a second antenna array at the bottom of terminal device 102. Antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. Baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O (input/output) instructions (e.g., software and/or firmware) stored in a non-transitory computer-readable storage medium), or as a combination of hardware and software components. Digital signal processor 208 may include one or more processors configured to retrieve and execute program code that defines control and processing logic for physical layer processing operations. Digital signal processor 208 may execute processing functions with software via the execution of executable instructions. Digital signal processor 208 may include one or more dedicated hardware circuits (e.g., ASICs (Application Specific Integrated Circuits), FPGAs (Field Programmable Gate Arrays), and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. The processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a protocol processor configured to execute protocol stack software (retrieved from a controller memory) and subsequently control the radio communication components of terminal device 102 to transmit and receive communication signals in accordance with the corresponding protocol stack control logic defined in the protocol software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Memory 214 may be a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select available network access nodes in order to maintain a strong radio access connection with the radio access network of radio communication network 100. For example, terminal device 102 may establish a radio access connection with network access node 110 while terminal device 104 may establish a radio access connection with network access node 112. If the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

A wireless communication device configured for different wireless technologies may require multiple antennas. For example, a laptop configured for 5G, Wi-Fi, and/or MIMO communication, may require a minimum of 6 antennas. With the addition of mmWave technology into the system of the wireless communication device, there may be need for more antennas in the system. The extra antennas may cause isolation and RFI issues between the antennas and other subsystems of the wireless communication device.

Figure 3:
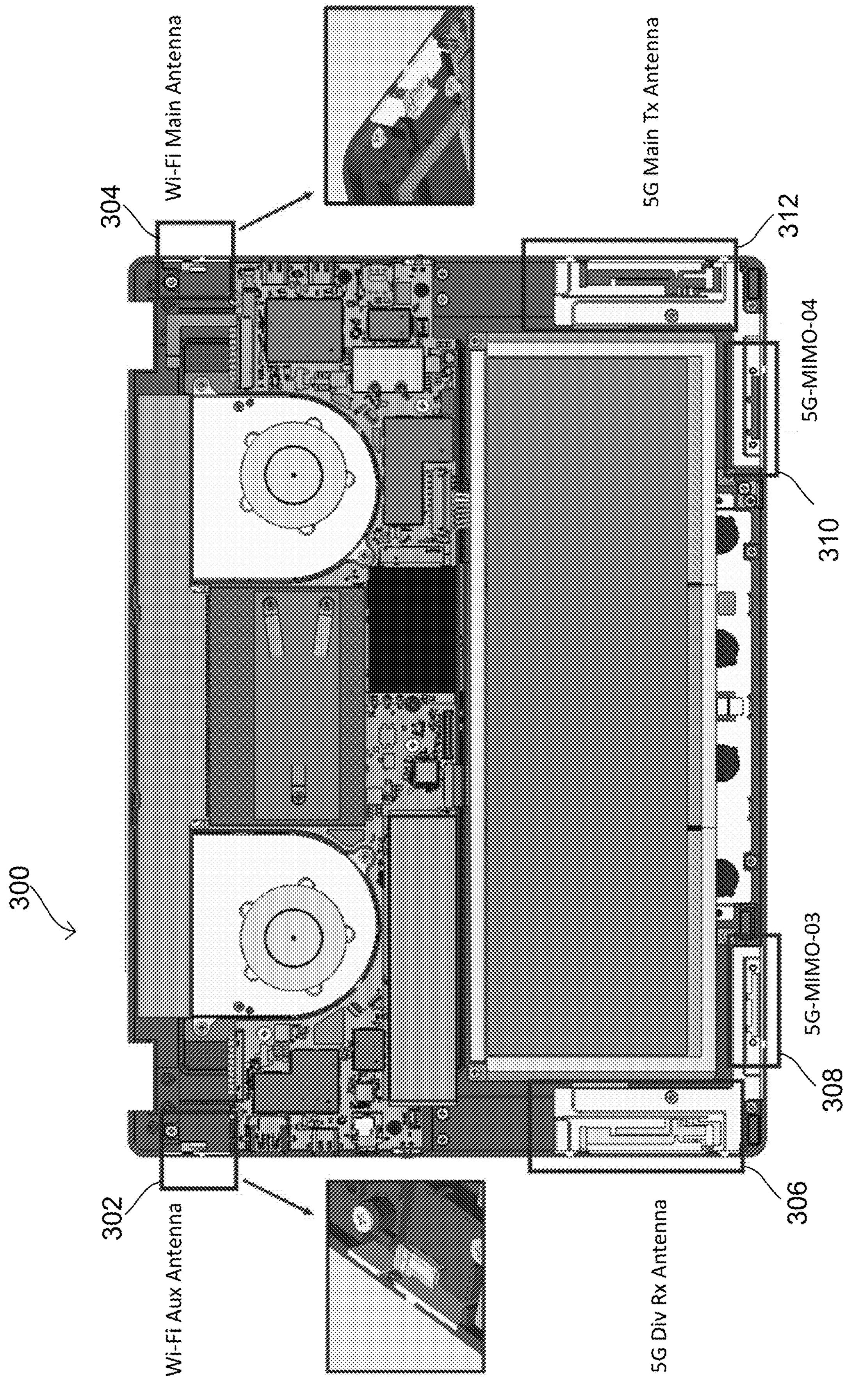
FIG. 3 illustrates an exemplary laptop system including antennas.

FIG. 3 shows a laptop system 300 configured for Wi-Fi and 5G communication. Laptop system 300 may include two Wi-Fi antennas 302 and 304 in positions near a hinge region of the laptop system 300. Laptop system 300 may also include four 5G antennas 306, 308, 310, and 312 in positions near a mouse pad area of laptop system 300. The Wi-Fi antennas 302 and 304 are in position that is as remote as possible from 5G antennas 306, 308, 310 and 312 in laptop system 300. The four 5G antennas 306, 308, 310 and 312 are in four different locations of laptop system 300 and require space between antennas. This space between the antennas may be referred to as the KOZ which helps reduce the effect antenna radiation may have to nearby sub-systems of laptop system 300. This placement of Wi-Fi antennas 302 and 304 and 5G antennas 306, 308, 310, and 312 as shown in FIG. 3 may require RFI mitigation techniques to restrict the interference from the antennas because each antenna is a potential source for the RFI because antennas are radiators.

Figure 4:
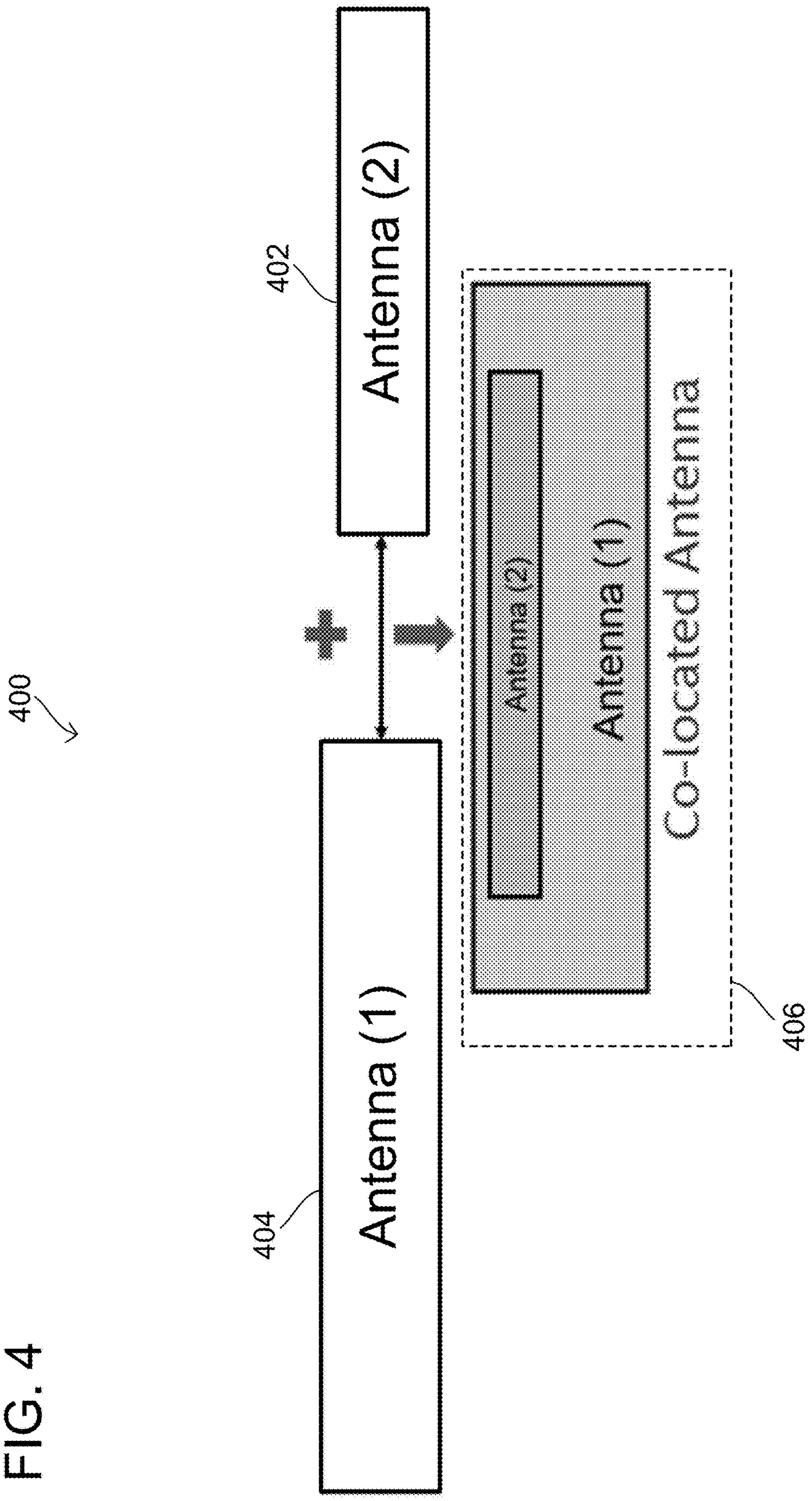
FIG. 4 illustrates an exemplary combined antenna including two antennas of two different radio access technologies (RAT).

FIG. 4 shows co-location 400 of two antennas which are configured for different RATs. For example, Wi-Fi antenna 402 may be configured for electrical field dominant communication and 5G antenna 404 may be configured for magnetic field dominant communication. Wi-Fi antenna 402 and 5G antenna 404 may be fused together to created combined antenna 406. Because Wi-Fi antenna 402 is configured for electrical dominant communication and 5G antenna 404 is configured for magnetic field dominant communication, both the antennas can be co-located without affecting the performance of the individual antennas. Alternatively, the same is applicable if Wi-Fi antenna 402 were configured for magnetic field dominant communication and 5G antenna 404 were configured for electrical field dominant communication. Additionally, co-locating antennas may be extended to other combinations of antennas like WiFi-MIMO, 5G-MIMO.

Figure 5:
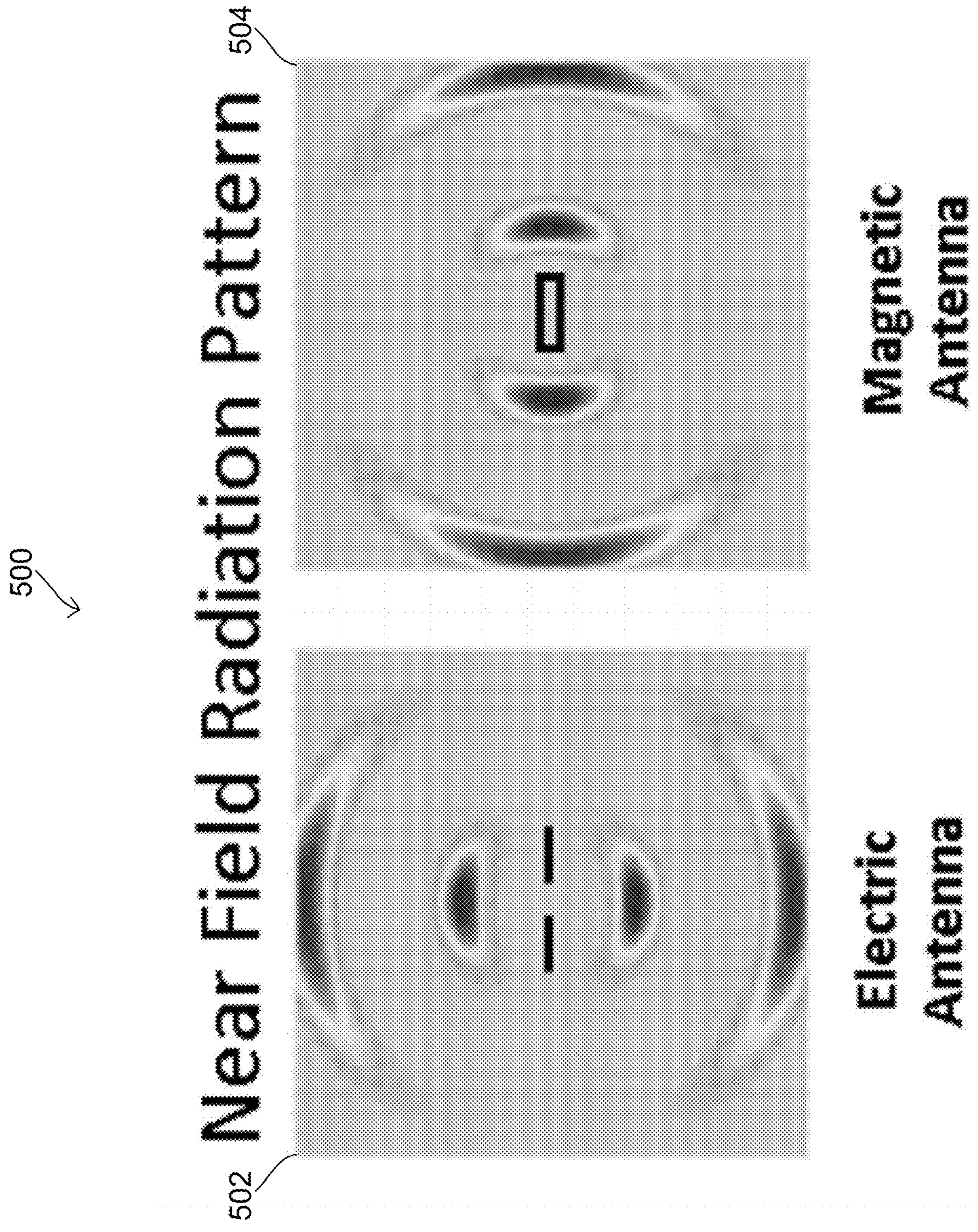
FIG. 5 illustrates exemplary radiation patterns of antennas of different RATs.

FIG. 5 shows near field radiation patterns 500. Patterns 500 may include near field radiation pattern 502 and near field radiation pattern 504. Near field radiation pattern 502 may generated by an electrical field dominant antenna such as a Wi-Fi antenna. Near field radiation pattern 504 may generated by a magnetic field dominant antenna such as a 5G antenna. As shown in FIG. 5, electrical field radiation pattern 502 is generated in a y-direction of a plane and magnetic field radiation pattern 504 is generated in an x-direction of the plane. Because radiation patterns 502 and 504 radiate in perpendicular directions, two antennas generating radiation patterns 502 and 504 may be co-located together with little to no interference. As such, co-locating an electrical field dominant antenna such as a Wi-Fi antenna and a magnetic field dominant antenna such as a 5G antenna does not negatively affect performance of either antenna.

Figure 6:
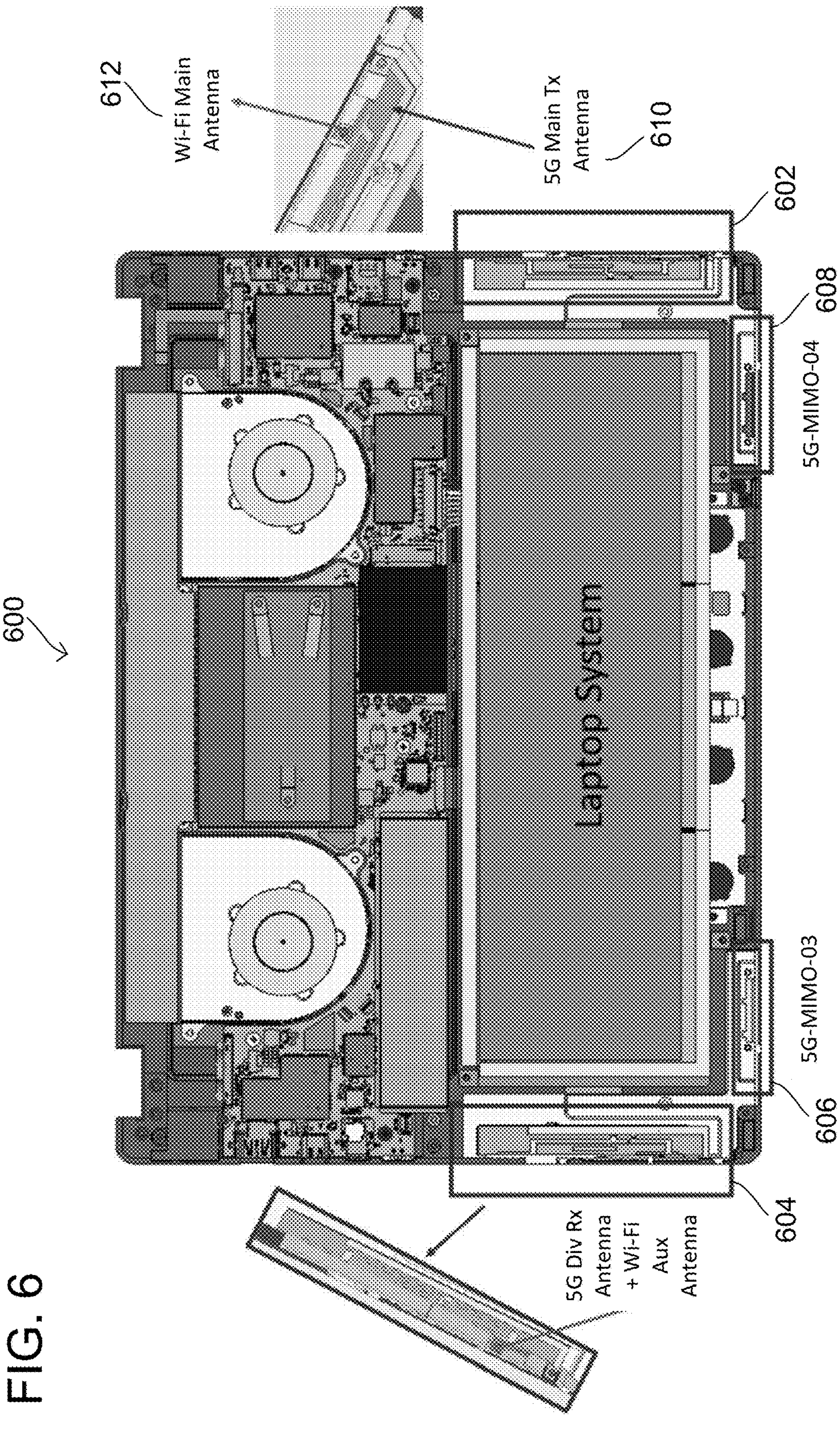
FIGS. 6-16 illustrate exemplary laptop systems including combined antennas.

FIG. 6 shows laptop system 600 configured for Wi-Fi and 5G communication. Laptop system 600 may include two combined antennas 602 and 604 where each combined antenna includes a Wi-Fi antenna and a 5G antenna. Laptop system 600 may also include two 5G antennas 606 and 608.

For example, 5G antennas 606 and 608 may be configured for 5G multiple input multiple output (MIMO) communication. Combined antenna 602 may combine a 5G aperture antenna 610 which is electrical field dominant and a Wi-Fi T slot antenna 612 which is magnetic field dominant. Combined antenna 602 may fuse antenna 610 and antenna 612 in the same location. Combined antenna 602 may occupy one position instead of two separate positions for antennas 610 and 612 in laptop system 600. The single position reduces the RF noise mitigation techniques to the location of combined antenna 602 as opposed to using RFI mitigation techniques for each antenna 610 and 612. The same may apply to other combined antennas such as combined antenna 604.

Figure 7:
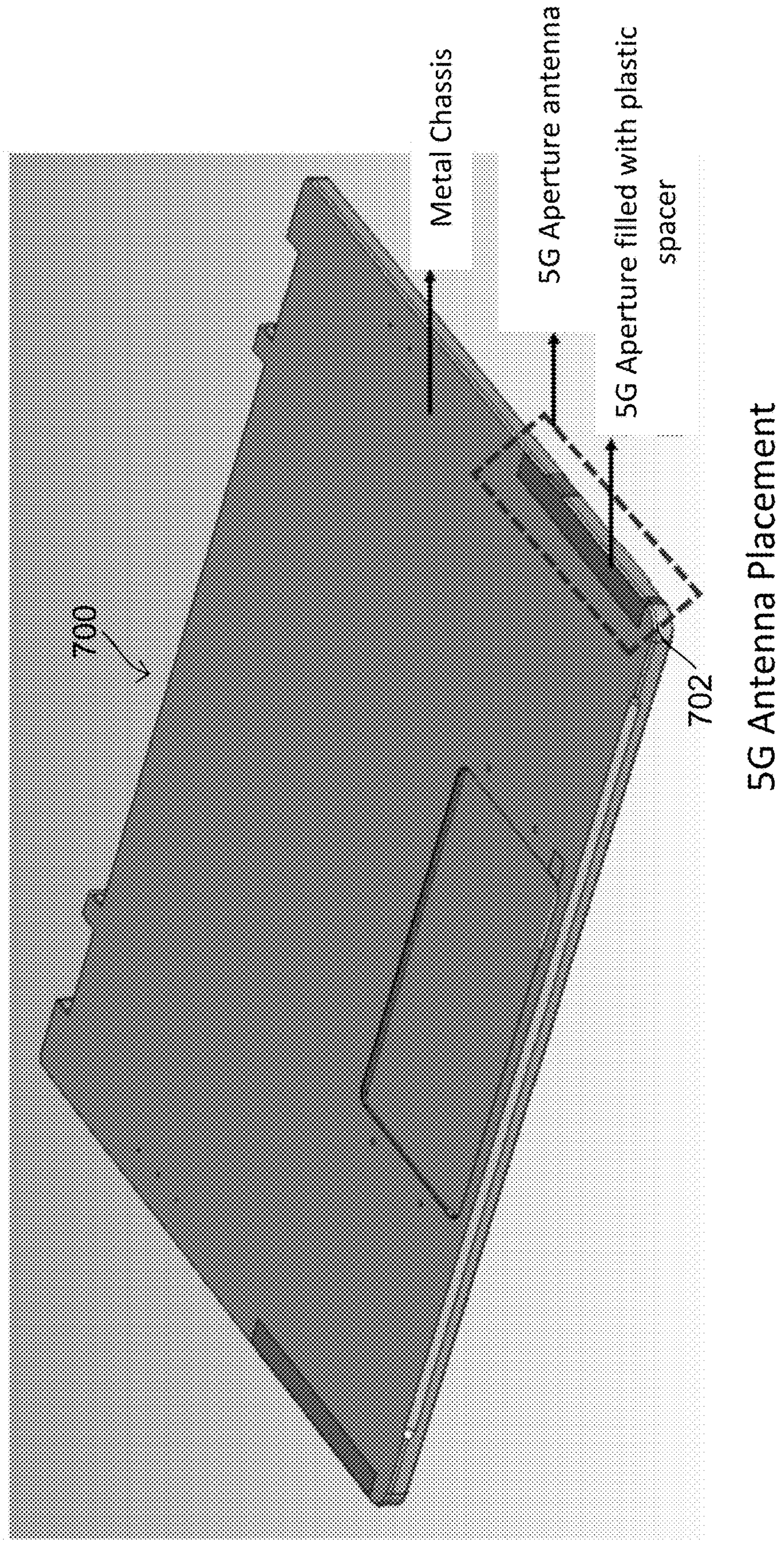

FIG. 7 shows laptop chassis 700. Laptop chassis 700 may include antenna window 702. Antenna window 702 may be configured for a 5G antenna, as previously described, in a laptop system. Laptop chassis 700 may be a metal chassis or a metal lined chassis. For example, a plastic chassis with a metal lining.

Figure 8:
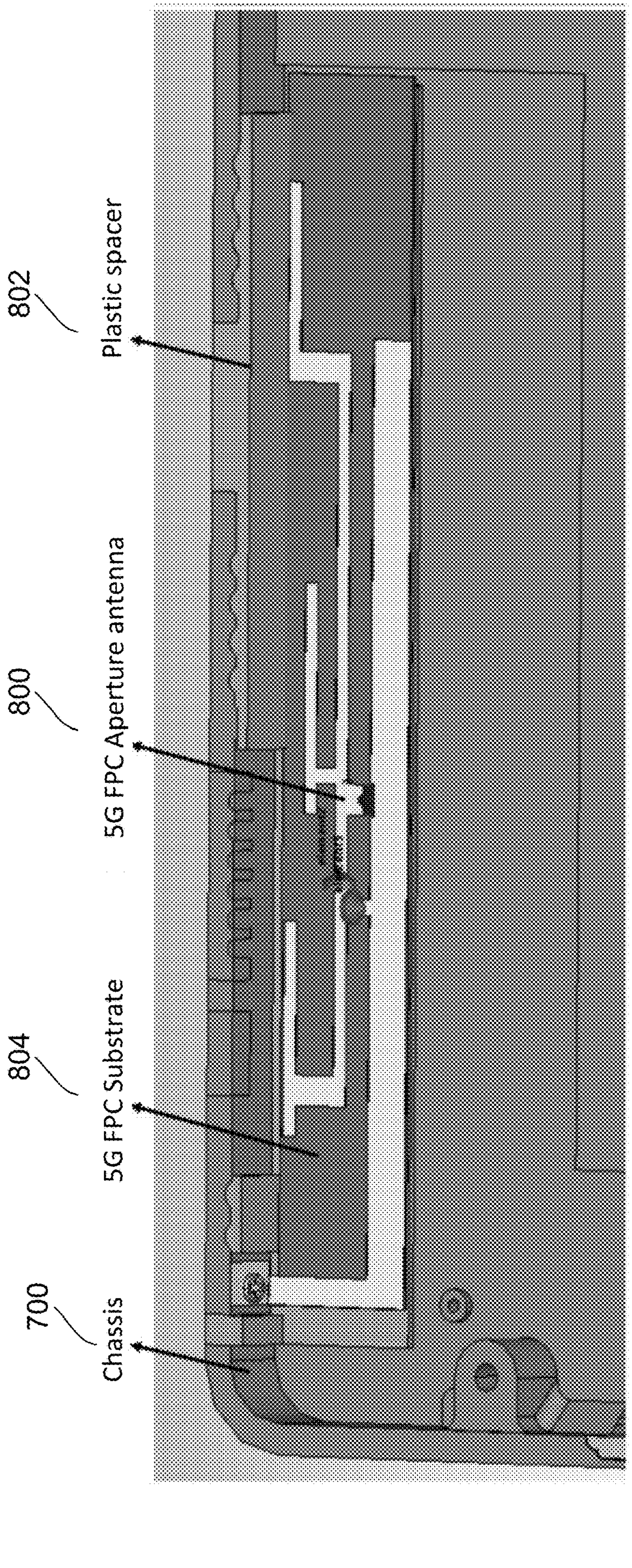

FIG. 8 shows placement of 5G antenna 800 in laptop chassis 700. 5G antenna 800 may be designed such that a portion of laptop chassis 700 is used as the radiating element for low bands. A gap between the chassis 700 and 5G antenna 800 may be filled with dielectric spacer 802. 5G antenna 800 may be excited through the flexible printed circuit (FPC) 804 which is placed along laptop chassis 700 as shown.

Figure 9:
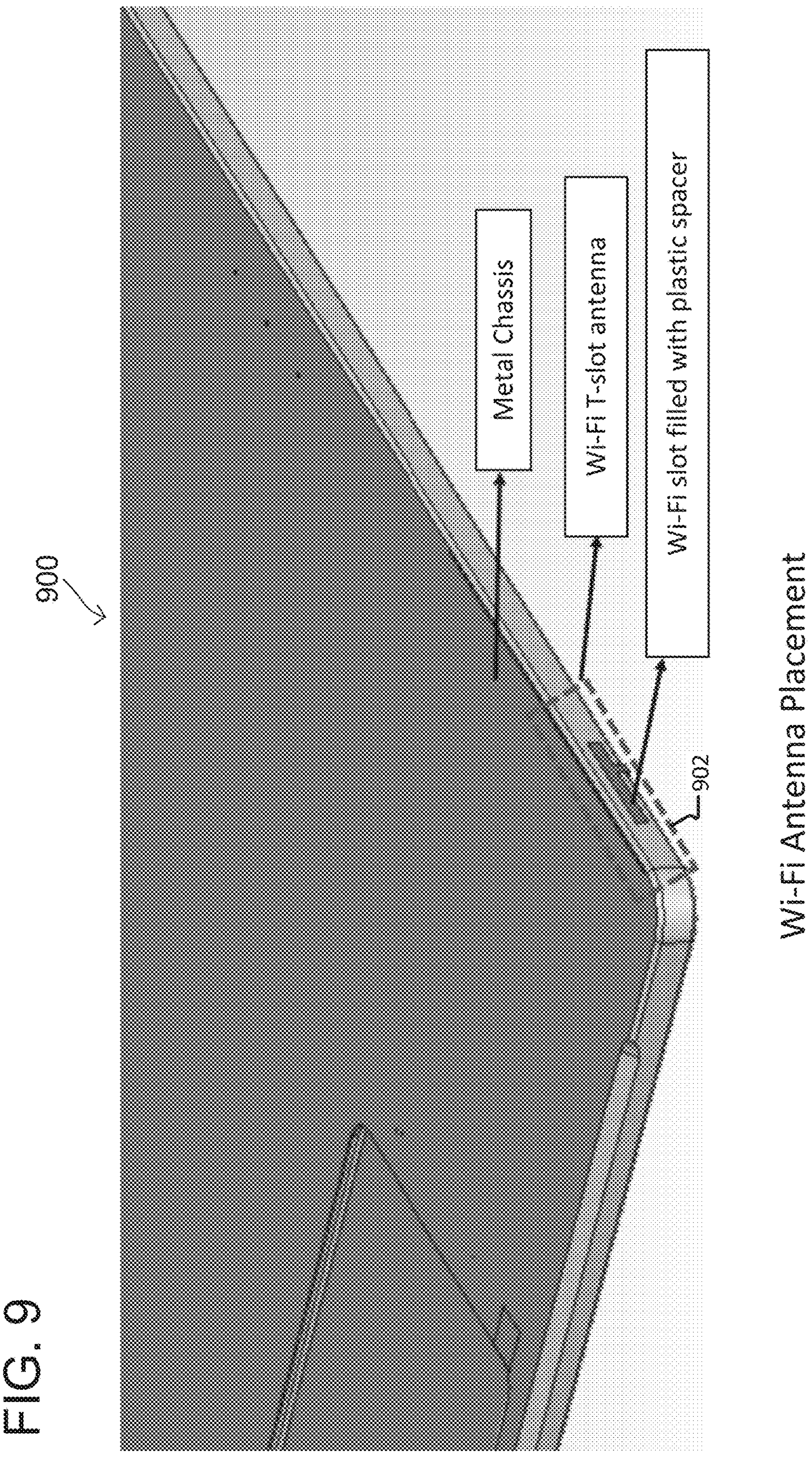

FIG. 9 shows laptop chassis 900. Laptop chassis 900 may include antenna window 902. Antenna window 902 may be configured for a Wi-Fi antenna, as previously described, in a laptop system. Laptop chassis 900 may be a metal chassis or a metal lined chassis. For example, a plastic chassis with a metal lining.

Figure 10:
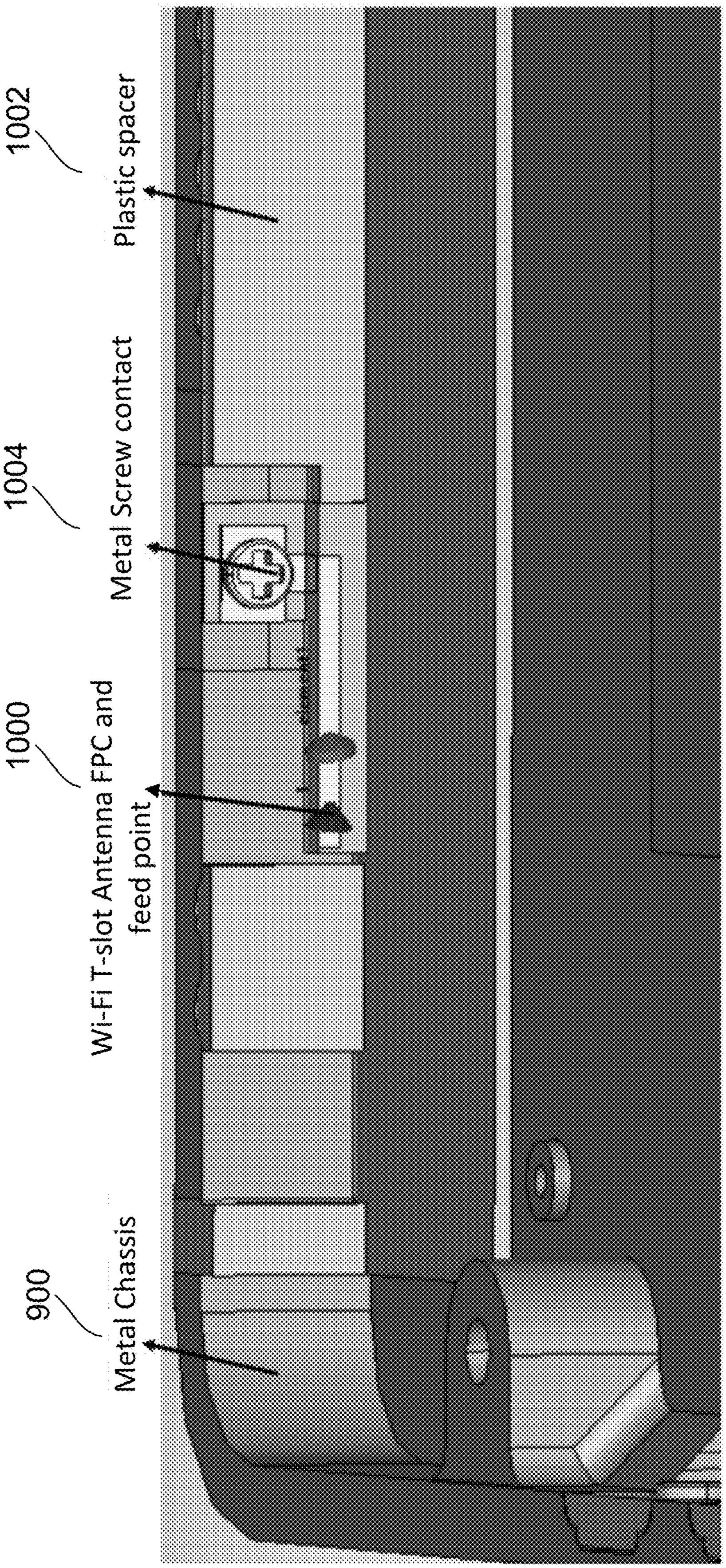

FIG. 10 shows placement of Wi-Fi antenna 1000 in laptop chassis 900. Wi-fi antenna 1000 may be a Wi-Fi T-slot antenna designed for placement along the Z-wall of laptop chassis 900 as shown in FIG. 10. Wi-Fi antenna 1000 may be fed from inside using an FPC which is placed over a dielectric block 1002 to support the FPC. The FPC is connected to the chassis with the help screw 1004 as shown in FIG. 10. The T-slot 902 may be filled with dielectric material 1002. For example, a polycarbonate dielectric whose dK value is 3.5.

Figure 11:
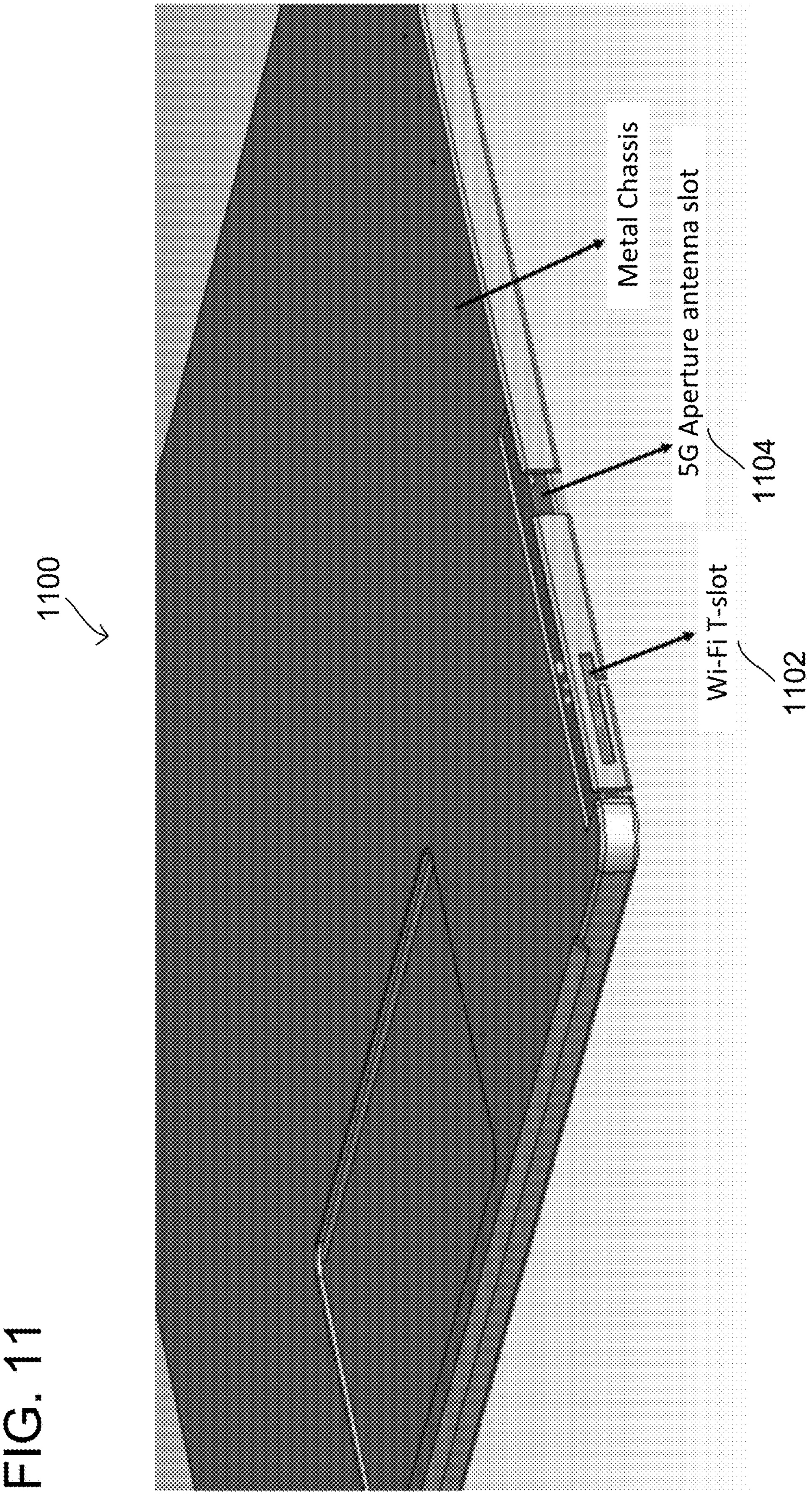

FIG. 11 shows laptop chassis 1100. Laptop chassis 1100 may include antenna windows 1102 and 1104 configured for a combined antenna. Antenna window 1102 may be configured for a Wi-Fi antenna and antenna window 1104 may be configured for a 5G antenna. Laptop chassis 1100 may be a metal chassis or a metal lined chassis. For example, a plastic chassis with a metal lining.

Figure 12:
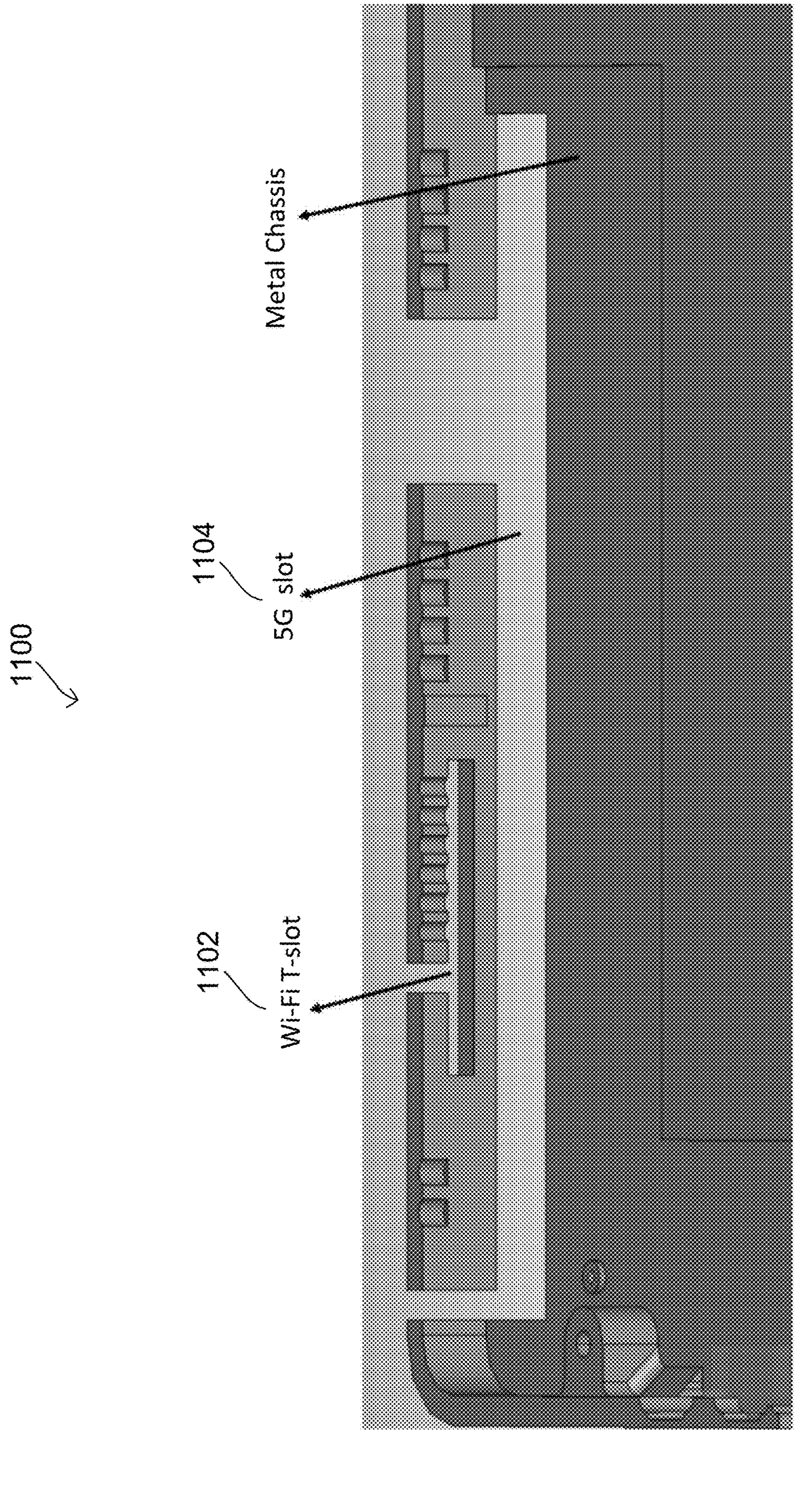

FIG. 12 shows inside view of chassis 1100 with antenna windows 1102 and 1104.

Figure 13:
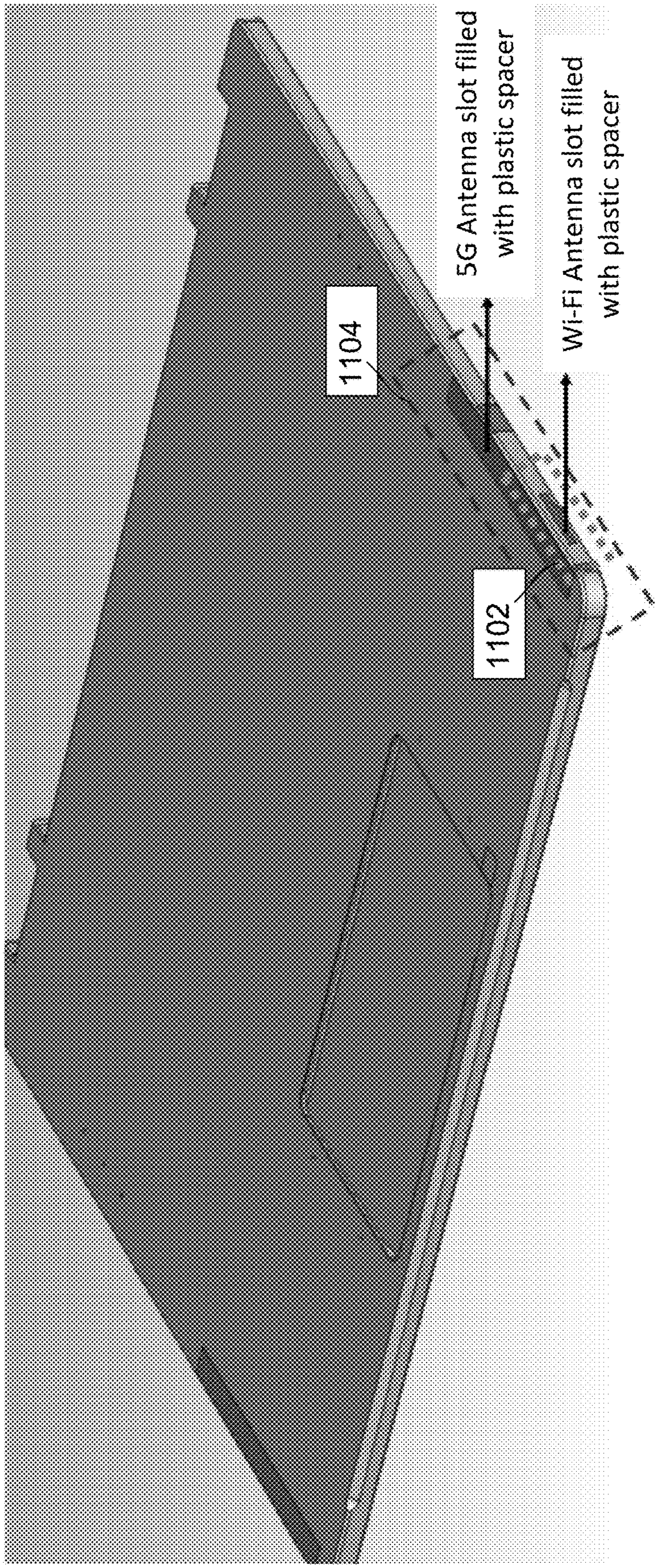

FIG. 13 shows antenna window 1102 and antenna window 1104 filled with a dielectric material, for example plastic.

Figure 14:
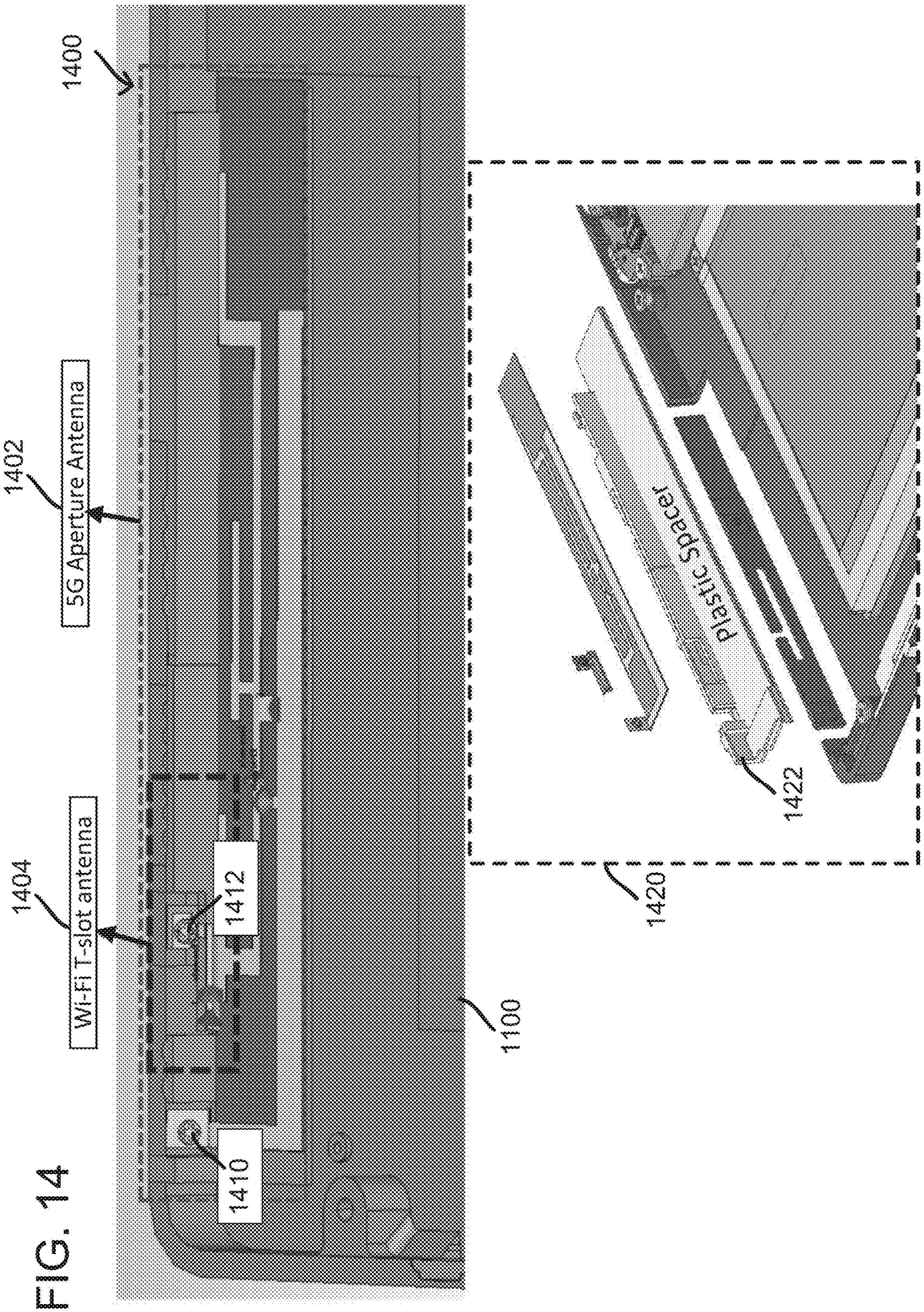

FIG. 14 shows placement of combined antenna 1400 in laptop chassis 1100. Combined antenna 1400 may include 5G FPC aperture antenna 1402 which is configured to operate between frequencies 0.617 to 7.125 GHz. Combined antenna 1400 may also include T-slot Wi-Fi antenna 1404 which is configured to operate between frequencies 2.4 GHz to 2.5 GHz and 5.125 to 7.125 GHz. Both the antennas 1402 and 1404 may be co-located at the same position and placed in chassis 1100 as shown in FIG. 14.

T-slot Wi-Fi antenna 1404 which may be configured to operate over frequencies 2400-2480 MHz and 5125-7125 MHz may be placed along a vertical arm of 5G aperture antenna 1402 which may be configured to operate over the frequencies 617 MHz to 6 GHz. The vertical arm of antenna may operate as a radiator for low frequency band, for example a band ranging from 617 MHz to 960 MHz frequencies. 5G antenna 1402 may occupy and area of 80×7×5 mm and Wi-Fi antenna 1404 may occupy an area of 21×5×4 mm. Combined antenna 1400 may be coupled to laptop chassis 1100 with screws 1410 and 1412. Screw 1410 may secure 5G aperture antenna 1402 to laptop chassis 1100. Screw 1412 may secure Wi-Fi antenna 1404 to laptop chassis 1100.

Assembly 1420 shows how co-located antennas 1402 and 1404 may be installed in laptop chassis 1100. Plastic insert 1422 be in a position between combined antenna 1400 and laptop chassis 1100. It should be noted that assembly 1420 shows separate antennas 5G antenna 1402 and Wi-Fi antenna 1404. However, combined antenna 1400 may be one part in which 5G antenna 1402 and Wi-Fi antenna 1404 are fused together or manufactured on a single substrate.

Figure 15:
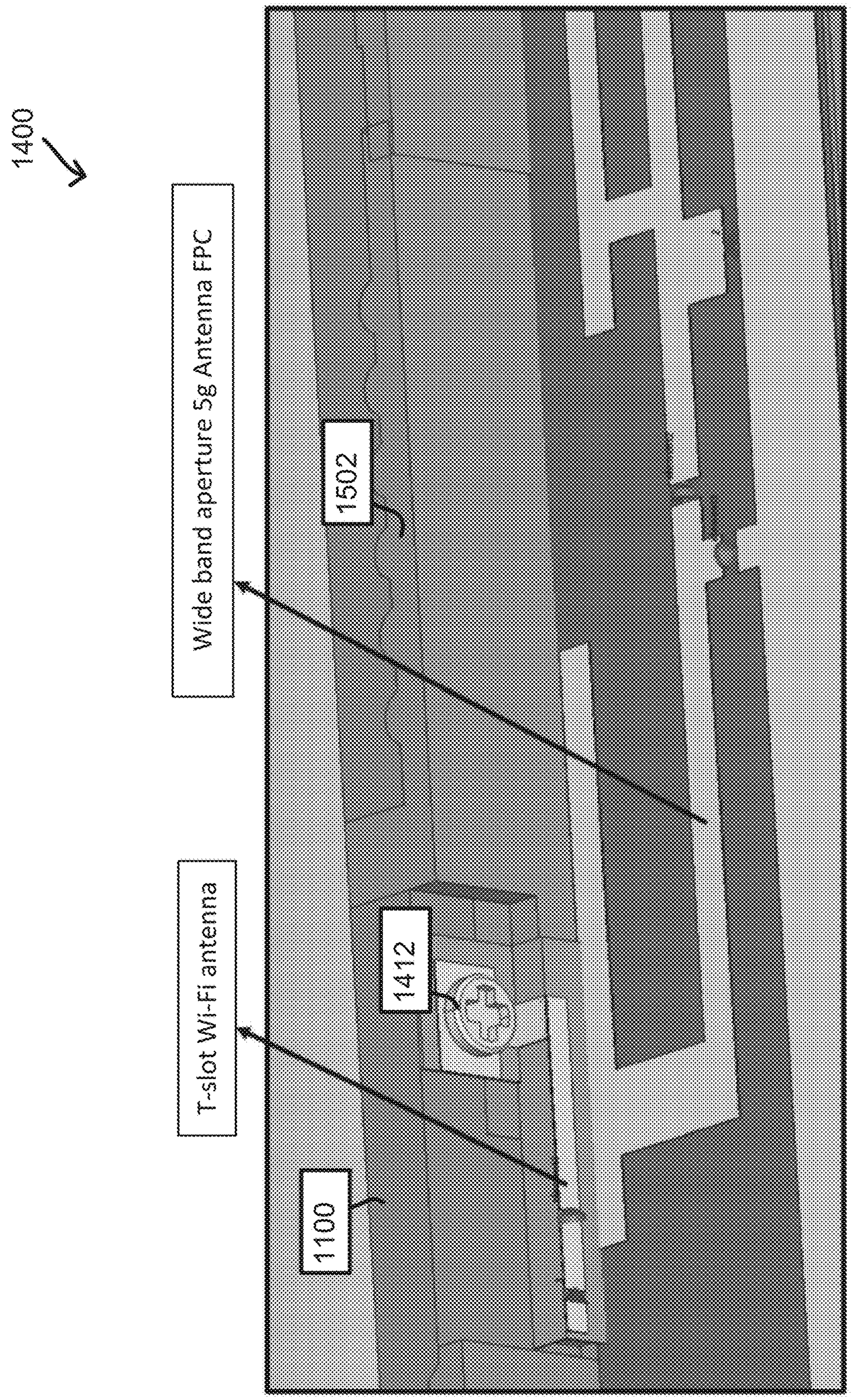

FIG. 15 shows a close view of combined antenna 1400. Combined antenna 1400 may attach to the inside of laptop chassis 1100 with screw 1412 and screw 1410 (not shown). Plastic support 1502 may lie between combined antenna 1400 and laptop chassis 1100. The FPCs of 5G antenna 1402 and Wi-Fi antenna 1404 may make contact with chassis 1100 using screw 1410 (not shown) and screw 1412 respectively. Wi-Fi antenna 1404 may include an FPC which is placed along a vertical arm of chassis 1100. 5G antenna 1402 may include an FPC which is placed along a horizontal arm of chassis 1100.

Figure 16:
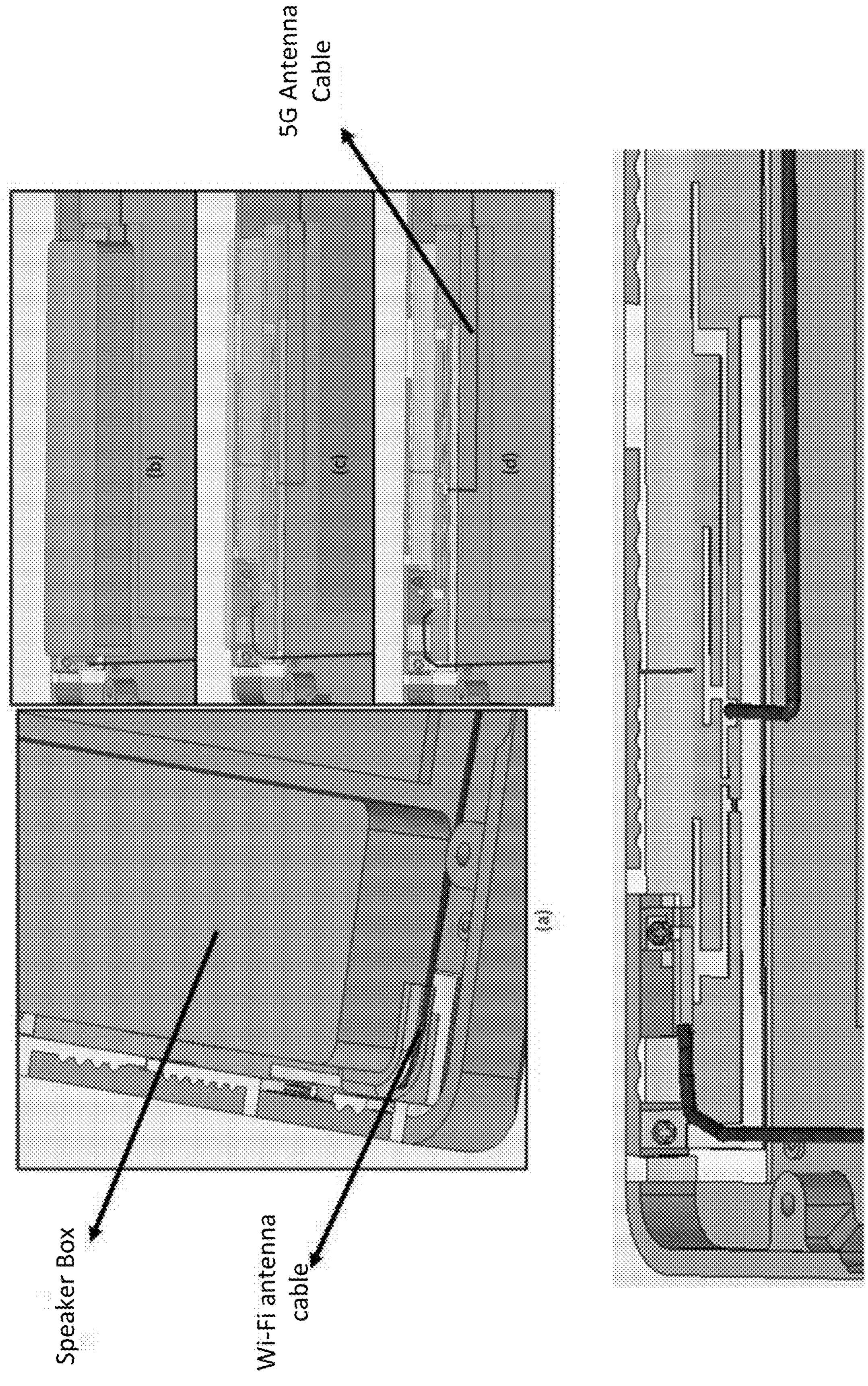

FIG. 16 shows cable routing for combined antenna 1400 in a laptop system. Closeup 1610 shows 5G cable 1602 and Wi-Fi cable 1604 coupled to 5G antenna 1402 and Wi-Fi antenna 1404 of combined antenna 1400. It may be beneficial to route antenna cables to not cross over each other. For example, it may be best to avoid routing a cable for Wi-Fi antenna 1404 over 5G antenna 1402. Routing antenna cables over each other may affect performance of one or both of the antennas 1402 and 1404. For example, a laptop system may include a speaker box 1600. 5G cable 1602 may be connected to 5G antenna 1402. 5G cable 1602 may run away from the vertical arm of chassis 1000 and under speaker box 1600. Wi-Fi cable 1604 may be connected to Wi-Fi antenna 1404. Wi-Fi cable 1604 may run around cable box 1600 to avoid running over Wi-Fi antenna 1404.

To improve performance, 5G antenna 1402 may be configured without an inductor and shorting its low band arm directly to ground by increasing the length of the aperture arm. In this way, 5G antenna 1402 may achieve required resonance and bandwidth.

FIGS. 17-21 show simulations of combined antennas as previously described.

Figure 17:
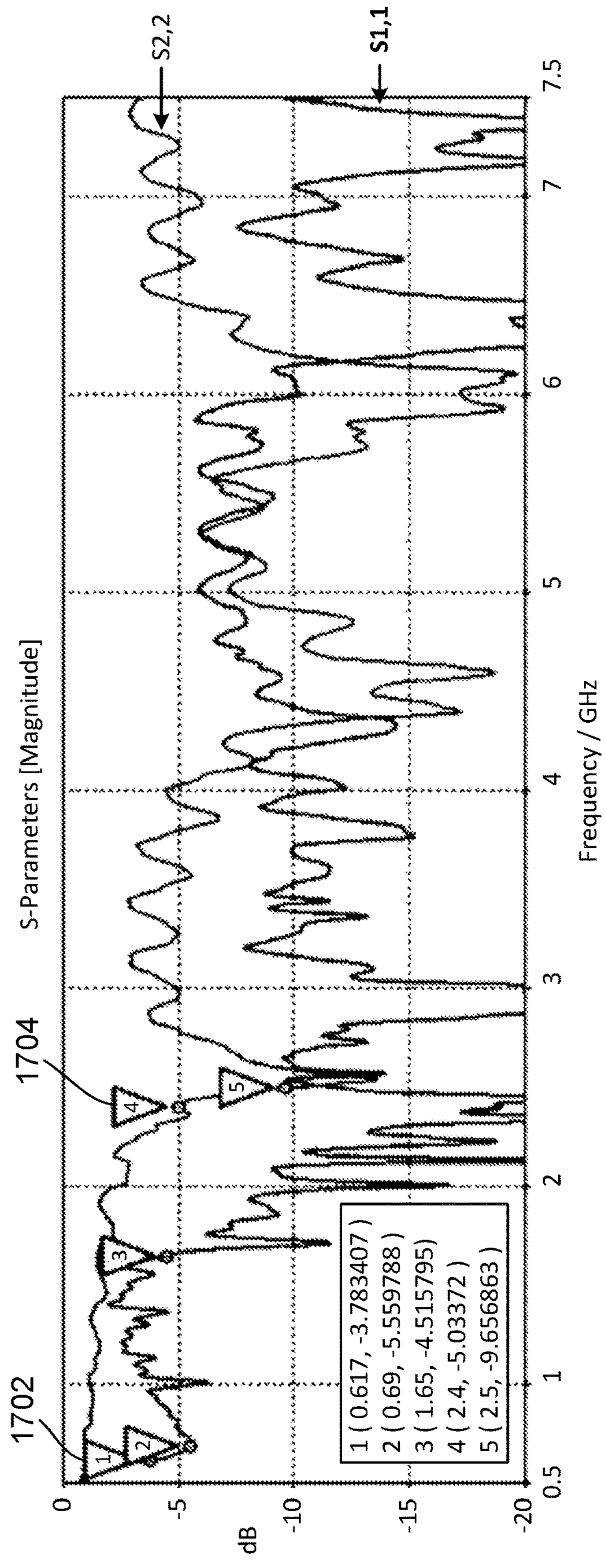
FIGS. 17-21 illustrate exemplary simulated results of a combined antenna.

FIG. 17 shows the antenna performance chart 1700 for a combined antenna including a 5G and Wi-Fi T-slot antenna. The return loss (5G S11, Wi-Fi S22 dB) of the combined antenna for port1 and port2 are shown in chart 1700. 5G Port 1 may operate from 0.617 GHz to 0.916 GHz, 1.45 GHz to 1.607 GHz, 1.710-2.69 GHz, 3.3 GHz to 5 GHz and 5.15 GHz to 7.125 GHz. Wi-Fi Port 2 may operate from 2.4 GHz to 2.5 GHz and 5.125 GHz to 7.125 GHz. Chart 1700 shows the combined antenna return loss is −4 dB at point 1702 for port 1 at 0.617 GHz. Chart 1700 shows the combined antenna return loss is −5 dB at point 1704 for port 2 at 2.4 GHz. A cable of length 350 mm is considered in the simulation as both the antennas must be fed from a module which is placed in the laptop system.

Figure 18:
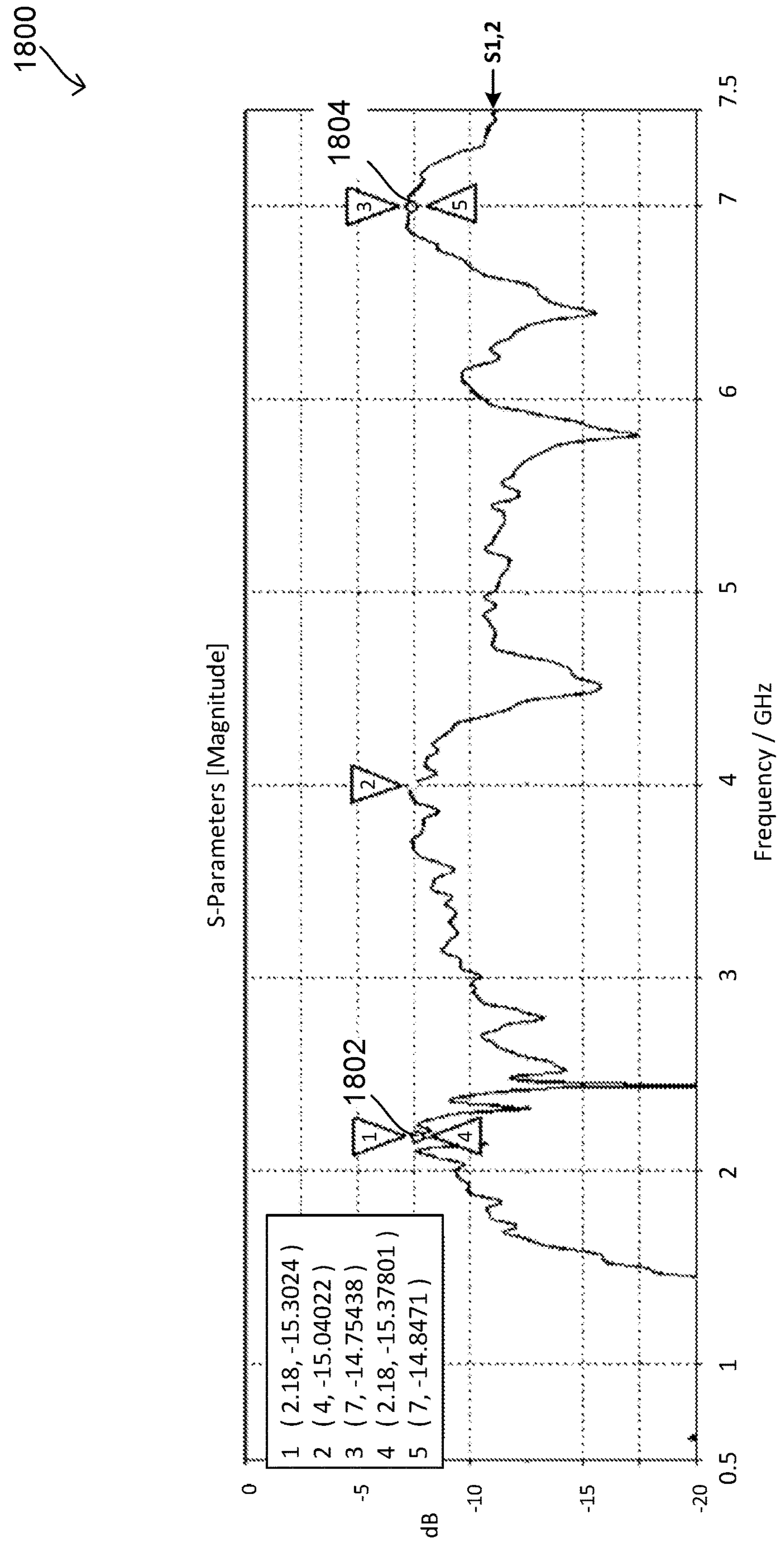

FIG. 18 shows the port-to-port isolation chart 1800 between 5G (port 1) and Wi-Fi (port 2) antennas in a combined antenna. It is observed at points 1802 and 1804 that an isolation of less than −15 dB is obtained which indicates that the two antennas are radiating independently without affecting each other.

Figure 19:
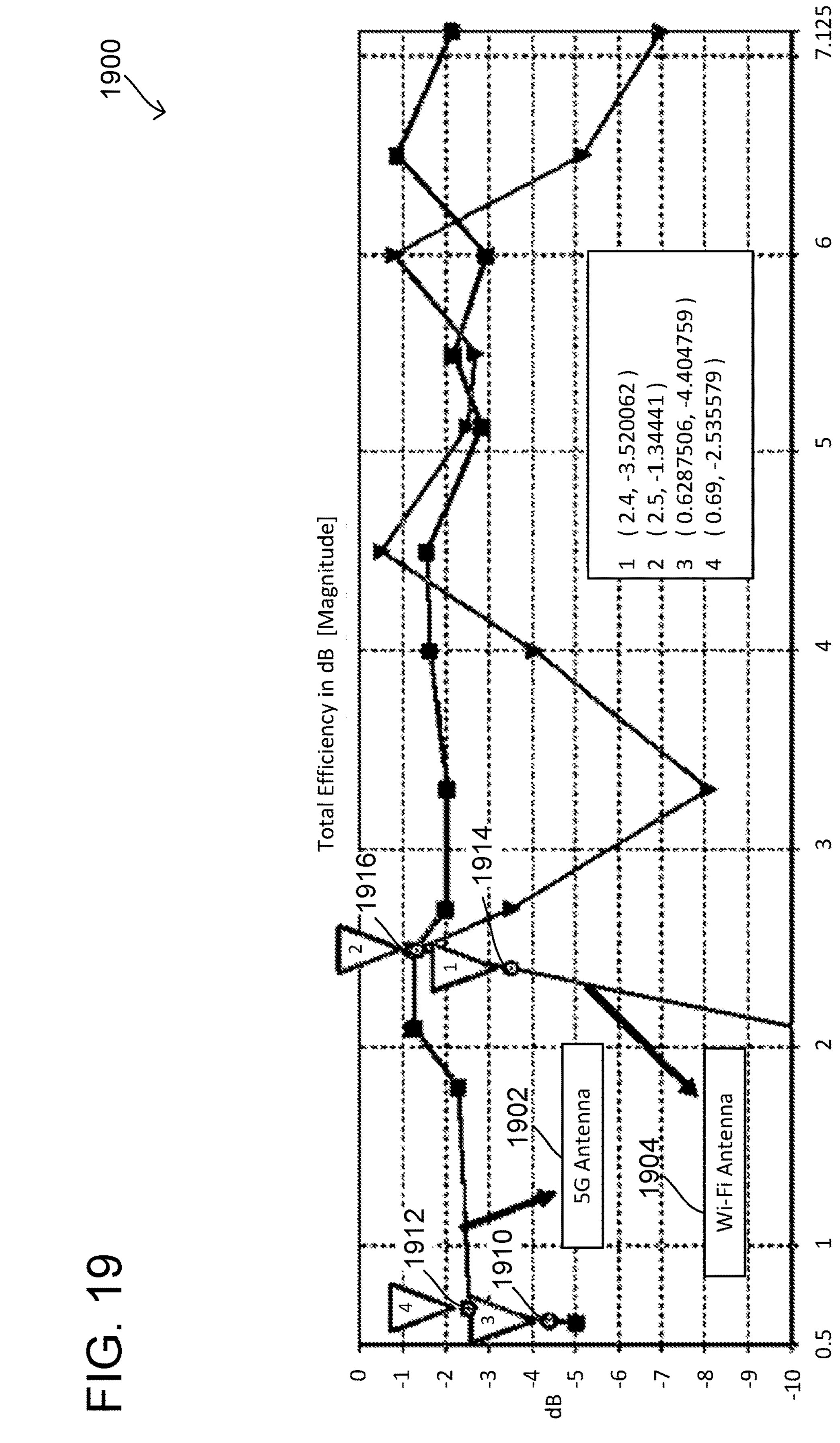

FIG. 19 shows an efficiency chart 1900. Efficiency chart 1900 shows an efficiency of 5G antenna 1902 and Wi-Fi antenna 1904. 5G antenna obtains an efficiency of greater than −5 db for at the low band for port1 shown at points 1910 and 1912. Wi-Fi antenna obtains an efficiency of −3.5 db or greater for port2 shown at points 1914 and 1916.

Figure 20:
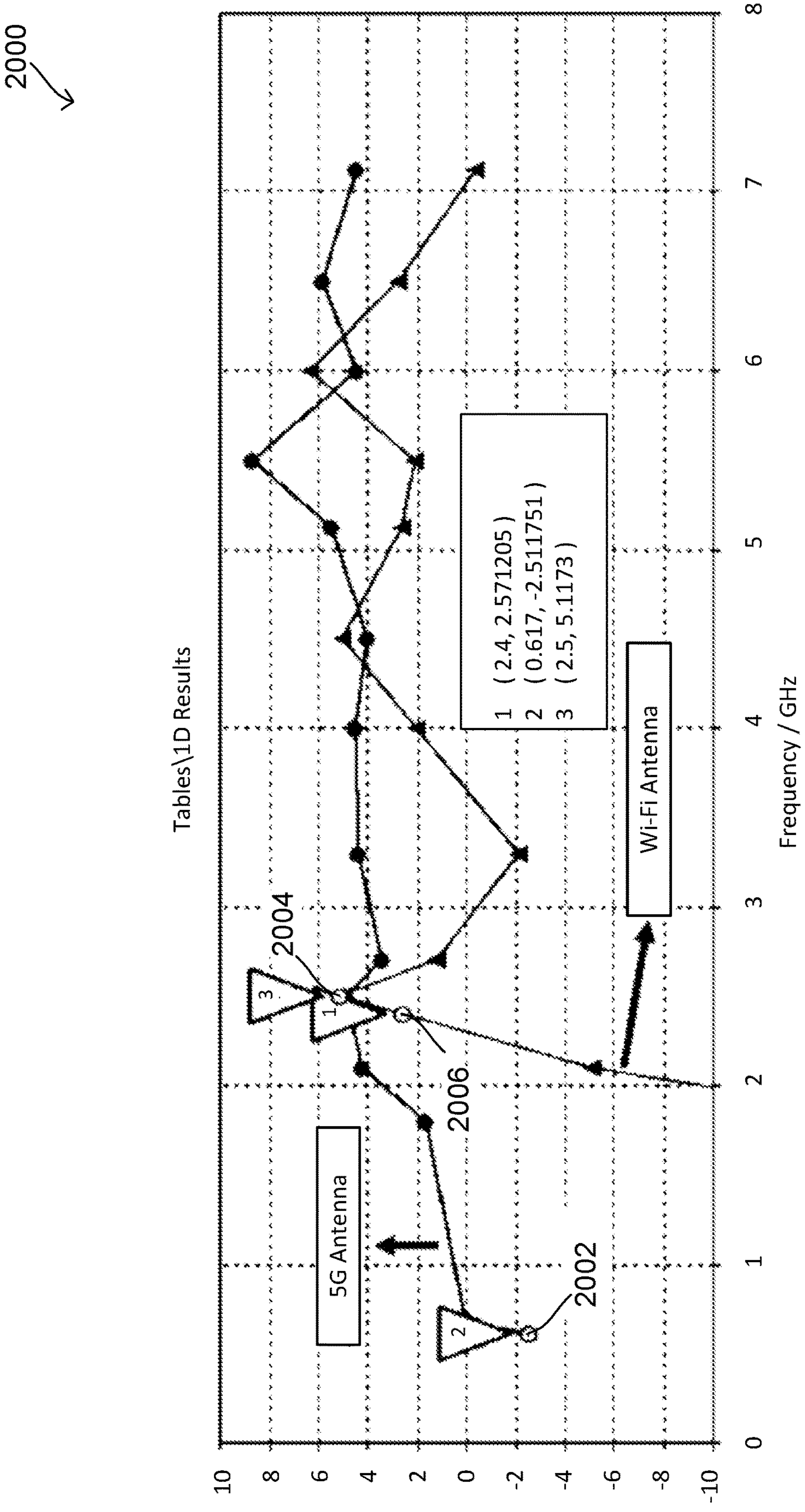

FIG. 20 shows an average gain chart 2000. Average gain chart 2000 shows an average gain of approximately −1.5 dBi at point 2002 for a 5G antenna at low bands for port 1. Average gain chart 2000 of over 2.5 dBi at points 2004 and 2006 for a Wi-Fi antenna at low bands for port2.

Figure 21:
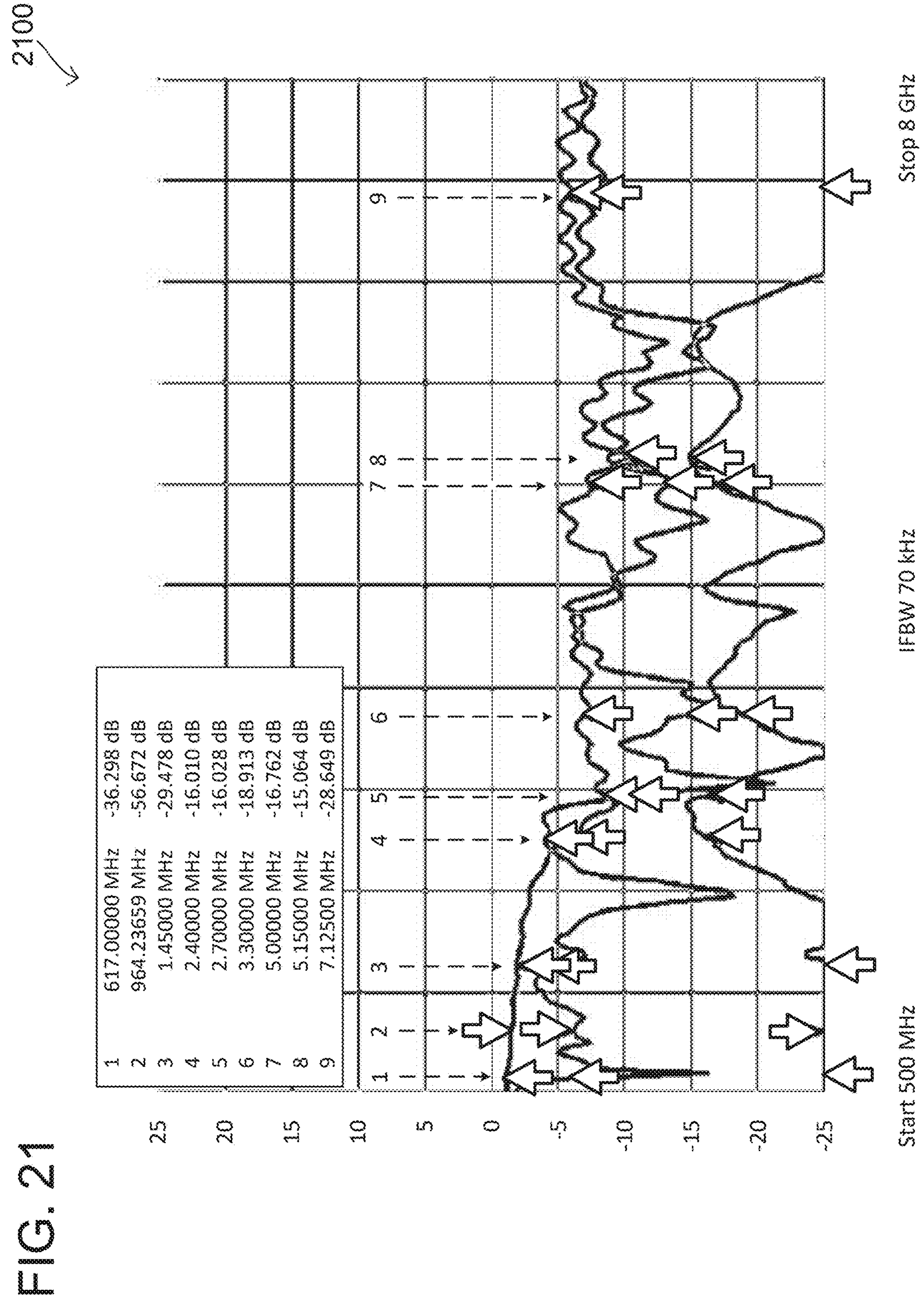

FIG. 21 shows loss measurement chart 2100. Chart 2100 shows measurements for return loss (RL) and isolation using vector network analysis (VNA). RL is measured at less than −5 dB for both Wi-Fi and 5G antennas of a combined antenna across most frequency bands. Isolation 2106 between a 5G antenna and a Wi-Fi antenna of the combined antenna is measured at less than −15 db for most frequency bands. Chart 2100 shows the performance of the combined antenna meets the performance requirements.

A prototype of combined antenna 1400 may include a 5G antenna and a Wi-Fi antenna as shown in FIG. 14. The simulation chart 2100 is based on prototype of combined antenna 1400. The prototype may include a chassis with antenna windows for combined antenna 1400 as shown in FIG. 12. 5G antenna of the prototype may reside horizontally along the chassis and Wi-Fi T-slot antenna of prototype may reside vertically along the chassis wall. An RF coaxial cable of approximately 300 mm long may feed both antennas. Wi-Fi antenna cable may be routed through and soldered to the low band arm of the 5G antenna. The path for the coupling the Wi-Fi antenna to a reference signal, or ground, may be through the 5G antenna. Both the Wi-Fi antenna and the 5G antenna may share a common ground path. The shared ground may not require an isolation circuit.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The terms "group," "set", "sequence," and the like refer to a quantity equal to or greater than one.

Any term expressed in plural form that does not expressly state "plurality" or "multiple" similarly refers to a quantity equal to or greater than one.

The term "lesser subset" refers to a subset of a set that contains less than all elements of the set.

Any vector and/or matrix notation utilized herein is exemplary in nature and is employed for purposes of explanation. This disclosure may be described with vector and/or matrix notation are not limited to being implemented with vectors and/or matrices and the associated processes and computations may be performed in an equivalent manner with sets or sequences of data or other information.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of with regard to a group of elements may be used herein to mean at least one element from the group consisting of the elements. For example, the phrase "at least one of with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The terms "processor" or "controller" may be understood to include any kind of technological entity that allows handling of any suitable type of data and/or information. The data and/or information may be handled according to one or more specific functions executed by the processor or controller. Further, a processor or a controller may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), and the like, or any combination thereof. Any other kind of implementation of the respective functions, which will be described below in further detail, may also be understood as a processor, controller, or logic circuit. It is understood that any two (or more) processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" is understood as a computer-readable medium (e.g., a non-transitory computer-readable medium) in which data or information can be stored for retrieval. References to "memory" may thus be understood as referring to volatile or non-volatile memory, including random access memory (RAM), read-only memory (ROM), flash memory, solid-state storage, magnetic tape, hard disk drive, optical drive, among others, or any combination thereof. Registers, shift registers, processor registers, data buffers, among others, are also embraced herein by the term memory. The term "software" may be used to refer to any type of executable instruction and/or logic, including firmware.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MS s), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. The circuitry may be implemented in, or functions associated with the circuitry may be implemented by, one or more software or firmware modules. Circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g., radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and/or the like. Logic may be executed by one or more processors using memory, e.g., registers, buffers, stacks, and the like, coupled to the one or more processors, e.g., as necessary to execute the logic.

The terms "communicate" and "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. The antenna may implement transmit and receive functionalities using separate transmit and receive antenna elements. The antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where e.g. the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Examples described herein can also implement a hierarchical application of the scheme, e.g. by introducing a hierarchical prioritization of usage for different types of users (e.g., low/medium/high priority, etc.), based on a prioritized access to the spectrum e.g. with highest priority to tier-1 users, followed by tier-2, then tier-3, etc. users, etc.

Some of the features in this document are defined for the network side, such as Access Points, eNodeBs, New Radio (NR) or next generation Node Bs (gNodeB or gNB— note that this term is typically used in the context of 3GPP fifth generation (5G) communication systems), etc. Still, a User Equipment (UE) may take this role as well and act as an Access Points, eNodeBs, gNodeBs, etc. i.e., some or all features defined for network equipment may be implemented by a UE.

Some examples may be used in conjunction with Radio Frequency (RF) systems, radar systems, vehicular radar systems, autonomous systems, robotic systems, detection systems, InfraRed (IR) systems, or the like. For example, with respect to systems, e.g., Light Detection Ranging (LiDAR) systems, and/or sonar systems, utilizing light and/or acoustic signals.

This disclosure may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

The following examples disclose various aspects of this disclosure:

In Example 1, a combined antenna circuitry including a first antenna configured to communicate via a first radio access technology (RAT); and a second antenna configured to communicate via a second RAT, wherein the second antenna is located on the first antenna.

In Example 2, a combined antenna circuitry including a first antenna configured to receive a second antenna, wherein the first antenna is configured to communicate via a first radio access technology (RAT), and wherein the second antenna is configured to communicate via a second radio access technology (RAT).

In Example 3, a combined antenna circuitry configured to receive a first antenna configured to communicate via a first radio access technology (RAT); and a second antenna configured to communicate via a second RAT, wherein a position of the second antenna is on top of the first antenna.

In Example 4, a combined antenna circuitry including a first antenna configured to communicate via a first radio access technology (RAT); and a second antenna configured to communicate via a second RAT, wherein the second antenna is in a position on the first antenna, and wherein the position achieves isolation between the first antenna and the second antenna.

In Example 5, the subject matter of any of Examples 1 to 4 may optionally further include, wherein the first antenna comprises a horizontal portion and a vertical portion.

In Example 6, the subject matter of any of Examples 1 to 5 may optionally further include, wherein the second antenna is located in a vertical position along the horizontal portion of the first antenna.

In Example 7, the subject matter of any of Examples 1 to 6 may optionally further include, wherein in the location of the second antenna on the first antenna is configured to achieve at least meet −15 dB of isolation between the first antenna and the second antenna.

In Example 8, the subject matter of any of Examples 1 to 7 may optionally further include, a substrate, wherein the first antenna and the second antenna are coupled to the substrate.

In Example 9, the subject matter of any of Examples 1 to 8 may optionally further include, wherein the first antenna is coupled to a first substrate, and the second antenna is coupled to a second substrate.

In Example 10, the subject matter of any of Examples 1 to 9 may optionally further include, wherein the first antenna is configured for magnetic field dominant communication.

In Example 11, the subject matter of any of Examples 1 to 10 may optionally further include, wherein the first antenna is a long term evolution (LTE) antenna.

In Example 12, the subject matter of any of Examples 1 to 11 may optionally further include, wherein the first antenna is a wireless fidelity (Wi-Fi) antenna.

In Example 13, the subject matter of any of Examples 1 to 12 may optionally further include, wherein the first antenna is a fifth generation (5G) antenna.

In Example 14, the subject matter of any of Examples 1 to 13 may optionally further include, wherein the first antenna is a multiple input, multiple output (MIMO) antenna.

In Example 15, the subject matter of any of Examples 1 to 14 may optionally further include, wherein the second antenna is configured for electric field dominant communication.

In Example 16, the subject matter of any of Examples 1 to 15 may optionally further include, wherein the second antenna is a long term evolution (LTE) antenna.

In Example 17, the subject matter of any of Examples 1 to 16 may optionally further include, wherein the second antenna is a wireless fidelity (Wi-Fi) antenna.

In Example 18, the subject matter of any of Examples 1 to 17 may optionally further include, wherein the second antenna is a fifth generation (5G) antenna.

In Example 18, the subject matter of any of Examples 1 to 18 may optionally further include, wherein the second antenna is a multiple input, multiple output (MIMO) antenna.

In Example 20, the subject matter of any of Examples 1 to 19 may optionally further include, one or more screw holes, wherein the one or more screw holes are each configured to receive a screw, and wherein the screw is configured to attach the combined antenna circuitry to a wireless communication device chassis.

In Example 21, the subject matter of any of Examples 1 to 20 may optionally further include, wherein the combined antenna circuitry is configured to fit in a spacer, wherein in the spacer is comprised of dielectric material.

In Example 22, a wireless communication device chassis including a first opening configured for a first antenna of a first radio access technology (RAT); a second opening configured for a second antenna of a second RAT; wherein the first opening surrounds the second opening.

In Example 23, the subject matter of Example 22 may optionally further include, a first screw hole, wherein the first screw hole is configured to receive a first screw to attach the first antenna to the wireless communication device chassis.

In Example 24, the subject matter of any of Examples 22 or 23 may optionally further include, a second screw hole, wherein the second screw hole is configured to receive a second screw to attach the second antenna to the wireless communication device chassis.

In Example 25, the subject matter of any of Examples 22 to 24 may optionally further be configured to receive a dielectric spacer between the first and second openings and the first and second antennas.

In Example 26, a system including any one of Examples 1 to 21 with any one of Examples 22 to 24.

In Example 27, a combined antenna circuitry including a first antenna configured for electric field dominant communication; and a second antenna configured for magnetic field dominant communication, wherein the second antenna is located on the first antenna.

In Example 28, the subject matter of any of Example 27 may optionally further include, wherein the first antenna comprises a horizontal portion and a vertical portion.

In Example 29, the subject matter of any of Examples 27 or 28 may optionally further include, wherein the second antenna is located in a vertical position along the horizontal portion of the first antenna.

In Example 30, the subject matter of any of Examples 27 to 29 may optionally further include, wherein in the location of the second antenna on the first antenna is configured to achieve at least meet −15 dB of isolation between the first antenna and the second antenna.

In Example 31, the subject matter of any of Examples 27 to 30 may optionally further include, a substrate, wherein the first antenna and the second antenna are coupled to the substrate.

In Example 32, the subject matter of any of Examples 27 to 31 may optionally further include, wherein the first antenna is coupled to a first substrate, and the second antenna is coupled to a second substrate.

In Example 33, the subject matter of any of Examples 27 to 32 may optionally further include, wherein the first antenna is configured for a first radio access technology (RAT).

In Example 34, the subject matter of any of Examples 27 to 33 may optionally further include, wherein the first antenna is a long term evolution (LTE) antenna.

In Example 35, the subject matter of any of Examples 27 to 34 may optionally further include, wherein the first antenna is a wireless fidelity (Wi-Fi) antenna.

In Example 36, the subject matter of any of Examples 27 to 35 may optionally further include, wherein the first antenna is a fifth generation (5G) antenna.

In Example 37, the subject matter of any of Examples 27 to 36 may optionally further include, wherein the first antenna is a multiple input, multiple output (MIMO) antenna.

In Example 38, the subject matter of any of Examples 27 to 37 may optionally further include, wherein the second antenna is configured for a second RAT.

In Example 39, the subject matter of any of Examples 27 to 38 may optionally further include, wherein the second antenna is a long term evolution (LTE) antenna.

In Example 40, the subject matter of any of Examples 27 to 39 may optionally further include, wherein the second antenna is a wireless fidelity (Wi-Fi) antenna.

In Example 41, the subject matter of any of Examples 27 to 40 may optionally further include, wherein the second antenna is a fifth generation (5G) antenna.

In Example 42, the subject matter of any of Examples 27 to 41 may optionally further include, wherein the second antenna is a multiple input, multiple output (MIMO) antenna.

In Example 43, the subject matter of any of Examples 27 to 42 may optionally further include, one or more screw holes, wherein the one or more screw holes are each configured to receive a screw, and wherein the screw is configured to attach the combined antenna circuitry to a wireless communication device chassis.

In Example 44, the subject matter of any of Examples 27 to 43 may optionally further include, wherein the combined antenna circuitry is configured to fit in a spacer, wherein in the spacer is comprised of dielectric material.

In Example 45, a system including any one of Examples 27 to 44 with any one of Examples 22 to 24.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

The terms "group," "set", "sequence," and the like refer to a quantity equal to or greater than one.

Any term expressed in plural form that does not expressly state "plurality" or "multiple" similarly refers to a quantity equal to or greater than one.

The term "lesser subset" refers to a subset of a set that contains less than all elements of the set.

Any vector and/or matrix notation utilized herein is exemplary in nature and is employed for purposes of explanation. Aspects of this disclosure described with vector and/or matrix notation are not limited to being implemented with vectors and/or matrices and the associated processes and computations may be performed in an equivalent manner with sets or sequences of data or other information.

The words "exemplary" and "demonstrative" are used herein to mean "serving as an example, instance, demonstration, or illustration". Any aspect, embodiment, or design described herein as "exemplary" or "demonstrative" is not necessarily to be construed as preferred or advantageous over other aspects, embodiments, or designs.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of with regard to a group of elements may be used herein to mean at least one element from the group consisting of the elements. For example, the phrase "at least one of with regard to a group of elements may be used herein to mean one of the listed elements, a plurality of one of the listed elements, a plurality of individual listed elements, or a plurality of a multiple of individual listed elements.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and/or may represent any information as understood in the art.

The term "terminal device" utilized herein refers to user-side devices (both portable and fixed) that can connect to a core network and/or external data networks via a radio access network. "Terminal device" can include any mobile or immobile wireless communication device, including User Equipments (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), gNodeBs, Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sectorization of a network access node. A network access node can thus serve one or more cells (or sectors), where the cells are characterized by distinct communication channels.

As used herein, the term "circuitry" may refer to, be part of, or include, an Application Specific Integrated Circuit (ASIC), an integrated circuit, an electronic circuit, a processor (shared, dedicated, or group), and/or memory (shared, dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The terms "communicate" and "communicating" as used herein with respect to a signal includes transmitting the signal and/or receiving the signal. For example, an apparatus, which is capable of communicating a signal, may include a transmitter to transmit the signal, and/or a receiver to receive the signal. The verb communicating may be used to refer to the action of transmitting or the action of receiving. In one example, the phrase "communicating a signal" may refer to the action of transmitting the signal by a transmitter, and may not necessarily include the action of receiving the signal by a receiver. In another example, the phrase "communicating a signal" may refer to the action of receiving the signal by a receiver, and may not necessarily include the action of transmitting the signal by a transmitter.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like. In one example, an antenna may be implemented as a separate element or an integrated element, for example, as an on-module antenna, an on-chip antenna, or according to any other antenna architecture.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Examples described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea), 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where e.g. the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Some examples may be used in conjunction with Radio Frequency (RF) systems, radar systems, vehicular radar systems, autonomous systems, robotic systems, detection systems, InfraRed (IR) systems, or the like. For example, with respect to systems, e.g., Light Detection Ranging (LiDAR) systems, and/or sonar systems, utilizing light and/or acoustic signals.

Some aspects may be used in conjunction with various devices and systems, for example, a radar sensor, a radar device, a radar system, a vehicle, a vehicular system, an autonomous vehicular system, a vehicular communication system, a vehicular device, an airborne platform, a waterborne platform, road infrastructure, sports-capture infrastructure, city monitoring infrastructure, static infrastructure platforms, indoor platforms, moving platforms, robot platforms, industrial platforms, a sensor device, a User Equipment (UE), a Mobile Device (MD), a wireless station (STA), a sensor device, a non-vehicular device, a mobile or portable device, and the like.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A circuit comprising:

a first antenna comprising a slot antenna configured to communicate via a first radio access technology (RAT), wherein the first antenna is disposed along a first plane; and a second antenna comprising a flexible printed circuit board (FPC) aperture antenna configured to communicate via a second RAT that is different from the first RAT, wherein the second antenna is disposed along a second plane that extends away from the first plane, wherein the second antenna is located at a position on the first antenna, wherein the first antenna together with the second antenna form an L-shaped antenna structure at the position.

2. The circuit of claim 1, wherein the second plane extends orthogonally away from the first plane.

3. The circuit of claim 1 further comprising a substrate, wherein the first antenna and the second antenna are coupled to the substrate.

4. The circuit of claim 1, wherein the first antenna is coupled to a first substrate, and wherein the second antenna is coupled to a second substrate.

5. The circuit of claim 1, wherein the first antenna has a first radiation pattern and the second antenna has a second radiation pattern, wherein the first radiation pattern is orthogonal to the second radiation pattern.

6. The circuit of claim 1, wherein the first antenna is configured for magnetic field dominant communication and the second antenna is configured for electric field dominant communication.

7. The circuit of claim 6, wherein the first antenna is a wireless fidelity (Wi-Fi) antenna, wherein the second antenna is a 5G antenna.

8. The circuit of claim 1, wherein the first antenna is one of a multiple input multiple output (MIMO) antenna, a long term evolution (LTE) antenna, a wireless fidelity (Wi-Fi) antenna, and a fifth generation (5G) antenna, wherein the second antenna is a different one of the MIMO antenna, the LTE antenna, the Wi-Fi antenna, and the 5G antenna.

9. The circuit of claim 1, further comprising one or more screw holes, wherein the one or more screw holes are each configured to receive a screw, and wherein the screw is configured to attach the first antenna and the second antenna to a chassis of a wireless communication device.

10. The circuit of claim 9, wherein there is a gap between the first antenna and the chassis, wherein the gap is configured to receive a dielectric spacer that contacts the chassis.

11. The circuit of claim 10, wherein the dielectric spacer comprises a polycarbonate dielectric with a dK value of about 3.5.

12. The circuit of claim 11, wherein the chassis comprises or is lined with a metal.

13. A wireless communication device comprising:

a first antenna of a first radio access technology (RAT), the first antenna comprising a slot antenna;

a second antenna of a second RAT that is different from the first RAT, the second antenna comprising a flexible printed circuit board (FPC) aperture antenna; and a chassis comprising a base plate along a first plane and a wall along a perimeter of the base plate, wherein the wall extends away from the base plate in a second plane that is different from the first plane, wherein the wall comprises:

a first opening configured for receiving the first antenna, wherein the first antenna is disposed along the wall in the second plane; and a second opening configured for receiving the second antenna, wherein the second antenna is disposed along the base plate in the first plane.

14. The wireless communication device of claim 13 further comprising:

a first screw hole configured to receive a first screw for attaching the first antenna to the chassis; and a second screw hole configured to receive a second screw for attaching the second antenna to the chassis.

15. The wireless communication device of claim 13, wherein the wall extends orthogonally away from the base plate such that the first plane is orthogonal to the second plane.

16. A co-located antenna system comprising:

a first antenna comprising a slot antenna configured for magnetic field dominant communication according to a first radio access technology (RAT), wherein the first antenna is disposed along a first plane;

a second antenna comprising a flexible printed circuit board (FPC) aperture antenna configured for electric field dominant communication according to a second radio access technology (RAT) that is different from the first RAT, wherein the second antenna is disposed along a second plane that extends away from the first plane; and a substrate to which the first antenna and the second antenna are attached, wherein the first antenna is co-located at a same position as the second antenna, wherein the first antenna attached to the second antenna form an L-shaped antenna structure.

17. The co-located antenna system of claim 16 further comprising a laptop chassis, wherein the first antenna, the second antenna, and the substrate are co-located within the laptop chassis.

18. The co-located antenna system of claim 16, wherein the slot antenna is a T-slot Wi-Fi antenna, wherein the FPC aperture antenna is a 5G aperture antenna.

19. The co-located antenna system of claim 18, wherein the 5G aperture antenna is configured to operate at frequencies between 0.617 GHz to 7.125 GHz, wherein the T-slot Wi-Fi antenna is configured to operate at frequencies between 2.4 GHz to 2.5 GHz and 5.125 GHz to 7.125 GHZ.

20. The co-located antenna system of claim 16, wherein the second plane extends orthogonally away from the first plane.

* * * * *